(12) United States Patent
Adams et al.

(10) Patent No.: US 12,528,993 B2
(45) Date of Patent: Jan. 20, 2026

(54) HIGH VALUE PRODUCTS DERIVED FROM COAL-BASED FEEDSTOCKS

(71) Applicant: University of Wyoming, Laramie, WY (US)

(72) Inventors: Jeramie J. Adams, Laramie, WY (US); Jianqiang Huo, Laramie, WY (US); Devang P. Khambhati, Laramie, WY (US); Jean-Pascal Planche, Laramie, WY (US); Joseph F. Rovani, Jr., Laramie, WY (US)

(73) Assignee: University of Wyoming, Laramie, WY (US)

( * ) Notice: Subject to any disclaimer, the term of this patent is extended or adjusted under 35 U.S.C. 154(b) by 1113 days.

(21) Appl. No.: 17/437,828

(22) PCT Filed: Mar. 12, 2020

(86) PCT No.: PCT/US2020/022338
§ 371 (c)(1),
(2) Date: Sep. 9, 2021

(87) PCT Pub. No.: WO2020/186031
PCT Pub. Date: Sep. 17, 2020

(65) Prior Publication Data
US 2022/0154075 A1 May 19, 2022

Related U.S. Application Data

(60) Provisional application No. 62/817,754, filed on Mar. 13, 2019, provisional application No. 62/817,205, filed on Mar. 12, 2019.

(51) Int. Cl.
| | | |
|---|---|---|
| C10C 1/18 | (2006.01) | |
| C08L 95/00 | (2006.01) | |
| C10C 3/02 | (2006.01) | |
| C10C 3/08 | (2006.01) | |
| C10G 21/16 | (2006.01) | |

(52) U.S. Cl.
CPC .............. *C10C 3/026* (2013.01); *C08L 95/00* (2013.01); *C10C 3/08* (2013.01)

(58) Field of Classification Search
CPC .. C10C 1/18; C10C 3/026; C10C 3/08; C10G 21/16
See application file for complete search history.

(56) References Cited

U.S. PATENT DOCUMENTS

| | | |
|---|---|---|
| 691,882 A | 1/1902 | Wright |
| 2,124,843 A | 7/1938 | Anderton |
| 2,476,999 A | 7/1949 | Orchin |
| 3,092,594 A | 6/1963 | Heiss |
| 3,120,474 A | 2/1964 | Gorin |
| 3,140,241 A | 7/1964 | Work et al. |
| 3,240,566 A | 3/1966 | Bullough et al. |
| 3,242,126 A | 3/1966 | Rickert |
| 3,391,098 A | 7/1968 | Kemp |
| 3,420,915 A | 1/1969 | Braithwaite |
| 3,477,941 A | 11/1969 | Nelson |
| 3,505,202 A | 4/1970 | Nelson |
| 3,558,468 A | 1/1971 | Wise |
| 3,583,900 A | 6/1971 | Gatsis |
| 3,645,885 A | 2/1972 | Harris et al. |
| 3,692,863 A | 9/1972 | Kmecak et al. |
| 3,748,254 A | 7/1973 | Gorin |
| 3,960,700 A | 6/1976 | Rosen et al. |
| 4,012,311 A | 3/1977 | Greene |
| 4,028,219 A | 6/1977 | Baldwin et al. |
| 4,030,982 A | 6/1977 | Gorin et al. |
| 4,056,460 A | 11/1977 | Malek |
| 4,090,957 A | 5/1978 | Leonard |
| 4,097,361 A | 6/1978 | Ashworth |
| 4,125,452 A * | 11/1978 | Effron ..................... C01B 3/323 208/263 |
| 4,145,274 A | 3/1979 | Green et al. |
| 4,177,135 A | 12/1979 | Rhodes |

(Continued)

FOREIGN PATENT DOCUMENTS

| | | |
|---|---|---|
| CN | 101280207 A | 10/2008 |
| CN | 101643660 | 2/2010 |

(Continued)

OTHER PUBLICATIONS

Ashida et al. (2008) "Fractionation of coal by use of high temperature solvent extraction technique and characterization of the fractions," Fuel 87(4-5): 576-582.

Ashida et al. (2009) "Fractionation of brown coal by sequential high temperature solvent extraction," Fuel 88(8): 1485-1490.

Atwood et al. (1977) "The TOSCOAL Process—Pyrolysis of Western Coals and Lignites for Char and Oil Production," Preprints of Papers American Chemical Society Division of Fuel Chemical 22(2): 233-252.

Bartle et al. (1979) "Structural analysis of supercritical-gas extracts of coals," Fuel 58: 413-422.

(Continued)

*Primary Examiner* — Randy Boyer
(74) *Attorney, Agent, or Firm* — Leydig, Voit & Mayer, Ltd.

(57) ABSTRACT

Methods of processing a coal-based feedstock to a high value product are provided. In one embodiment a method of processing a coal-based feedstock to a high value product, the method comprises the steps of: contacting the coal-based feedstock with one or more solvents under non-pyrolytic conditions thereby generating a liquid phase; and fractionating the liquid phase to generate at least two fractions under conditions such that at least one of the fractions is the high value product. The liquid phase may comprise 5 to 25 wt % oxygen and at least 70% of the oxygen in the liquid phase may be in the form of phenolic, carboxylic and ketone functional groups of hydrocarbon-based compounds.

21 Claims, 11 Drawing Sheets

(56) References Cited

U.S. PATENT DOCUMENTS

| | | | |
|---|---|---|---|
| 4,189,371 | A | 2/1980 | Maa et al. |
| 4,251,346 | A | 2/1981 | Dry et al. |
| 4,309,270 | A | 1/1982 | Tyler et al. |
| 4,318,959 | A | 3/1982 | Evans |
| 4,324,638 | A | 4/1982 | Durai-Swamy |
| 4,334,977 | A | 6/1982 | Derbyshire et al. |
| 4,356,077 | A | 10/1982 | Che |
| 4,358,344 | A | 11/1982 | Sass et al. |
| 4,374,725 | A | 2/1983 | Whitehurst et al. |
| 4,376,171 | A | 3/1983 | Blount |
| 4,415,429 | A | 11/1983 | Stadelhofer et al. |
| 4,415,431 | A | 11/1983 | Matyas et al. |
| 4,421,603 | A | 12/1983 | Hall |
| 4,490,213 | A | 12/1984 | Anthony |
| 4,547,282 | A | 10/1985 | Schindler et al. |
| 4,551,223 | A | 11/1985 | Sadhukhan |
| 4,563,197 | A | 1/1986 | Steinberg et al. |
| 4,661,532 | A | 4/1987 | Morin |
| 4,687,570 | A | 8/1987 | Sundaram et al. |
| 4,842,719 | A | 6/1989 | MacArthur et al. |
| 4,854,937 | A | 8/1989 | Meyer et al. |
| 5,026,475 | A | 6/1991 | Stuntz et al. |
| 5,240,592 | A | 8/1993 | Meyer et al. |
| 5,705,139 | A | 1/1998 | Stiller et al. |
| 6,288,133 | B1 | 9/2001 | Hagquist |
| 8,226,816 | B2 | 7/2012 | Kennel et al. |
| 8,846,776 | B2 | 9/2014 | Herrington et al. |
| 9,074,139 | B2 | 7/2015 | Quignard et al. |
| 9,481,759 | B2 | 11/2016 | Herrington et al. |
| 9,692,469 | B1 | 6/2017 | Clark et al. |
| 2008/0017549 | A1 | 1/2008 | Kennel et al. |
| 2008/0230935 | A1 | 9/2008 | Kennel et al. |
| 2011/0094937 | A1 | 4/2011 | Subramanian et al. |
| 2011/0313094 | A1 | 12/2011 | Yurovskaya et al. |
| 2013/0104611 | A1 | 5/2013 | Bauman et al. |
| 2014/0024872 | A1 | 1/2014 | Silverman et al. |
| 2015/0128335 | A1 | 5/2015 | Dehni |
| 2015/0136659 | A1 | 5/2015 | Barger et al. |
| 2015/0141708 | A1 | 5/2015 | Jan et al. |
| 2015/0218078 | A1 | 8/2015 | Mazanec et al. |
| 2015/0305211 | A1 | 10/2015 | Dhakate et al. |
| 2016/0311728 | A1 | 10/2016 | Swensen et al. |
| 2018/0051397 | A1 | 2/2018 | Hamaguchi et al. |
| 2020/0332197 | A1 | 10/2020 | Ackerman et al. |
| 2022/0177312 | A1 | 6/2022 | Schaeffers et al. |

FOREIGN PATENT DOCUMENTS

| | | |
|---|---|---|
| CN | 101845315 A | 9/2010 |
| CN | 102229810 A | 11/2011 |
| CN | 102585870 A | 7/2012 |
| CN | 103146411 | 6/2013 |
| CN | 102219649 | 5/2014 |
| CN | 106543389 A | 3/2017 |
| CN | 107109263 | 8/2017 |
| JP | S58-113289 A | 7/1983 |
| JP | H04-502340 A | 4/1992 |
| WO | WO 95/29969 | 11/1995 |
| WO | WO 2015/076973 | 5/2015 |
| WO | WO 2015/179806 | 11/2015 |
| WO | WO 2017049271 | 3/2017 |
| WO | WO 2018/004999 | 1/2018 |
| WO | WO 2018/188400 | 10/2018 |
| WO | WO 2019/055529 | 3/2019 |
| WO | WO 2020/186011 | 9/2020 |
| WO | WO 2020/186031 | 9/2020 |

OTHER PUBLICATIONS

Burgess Clifford et al. (2008) "Production of Coal-Based Fuels and Value-Added Products: Coal to Liquids Using Petroleum Refinery Streams," Energeia 19(1): 1-4.

Burke et al. (2001) "Summary Report of the DOE Direct Liquefaction Process Development Campaign of the Late Twentieth Century: Topical Report," Consol Energy Inc., 154 pp.

Coal Tar Free USA (2016) "First Guide to Asphalt Sealer Test Results," available online at https://coaltarfreeusa.com/2016/09/by-the-numbers-pah-guide-to-coal-tar-free-sealers/ [Accessed Apr. 28, 2020], 5 pp.

Colwell (2009) "Oil Refinery Processes: A Brief Overview," Process Engineering Associates, LLC: 36 pp.

Cortez et al. (1981) "Application of the Toscoal Process to the Electric Utility Industry," Tosco Corporation: 294-317.

Dakota Gasification Company (2015) "Funding approved for innovative lignite research projects," 1 pp.

Deshpande et al. (1984) "Extraction of coal using supercritical water," Fuel 63: 956-960.

Dhondt et al. (1978) "Union Oil's Shale Oil Demonstration Plant," Union Oil Company of California: 16-1 to 16-23.

Duncan et al. (Sep. 2017) "Attractiveness of Wyoming Powder River Basin (PRB) coal as a valuable resource from which to manufacture non-energy and fuel products," University of Wyoming, 16 pp.

Dutkiewicz (1982) "Commercializing the H-Coal™ Process," Proceedings from the Fourth Industrial Energy Technology Conference Houston, TX, pp. 174-180.

Funk (1981) "Separation of Heavy Oils Using Supercritical Fluids," Signal Research Center, Inc., pp. 148-153.

Grainger "Coal Tar Epoxy Epoxy, Urethane, and Specialty Coatings," available online at https://www.grainger.com/category/epoxy-urethane-and-specialty-coatings/specialty-paints-coatings-and-additives/paint-equipment-and-supplies/ecatalog/N-j75Z1z0alkw, [Accessed Feb. 6, 2018], 2 pp.

Hendrickson (1974) "Oil Shale Processing Methods," Quarterly of the Colorado School of Mines: 45-69.

Horner (Jun. 2017) "Wyoming Carbon Engineering Initiative," The Sixth International Advanced Energy Technology Conference, Xi'an, China, 18 pp.

Horner (Jun. 2018) "New Markets for Wyoming Powder River Basin (PRB) Coal by Addressing Carbon Management," 9th International Freiberg Conference on IGCC & XtL Technologies, Berlin, Germany, 26 pp.

Horner (Jun. 2019) "A Novel Integrated Solution for Making Valuable High-carbon Content Products from Powder River Basin (PRB) Coal with Near-zero Carbon Footprint," Clean Coal Technologies 2019 Conference, Houston, TX, 30 pp.

Horner (May 2017) "New Markets for Coal Chemicals and Performance Materials," The 8th International Conference on Clean Coal Technologies, Cagliari, Italy, 20 pp.

Horner (Sep. 2018) "'Green' Coal—A Reality Adoption of a Revolutionary Approach," 7th Coal Summit & Expo, New Delhi, India, 26 pp.

Horner (Sep. 2019) "Coal—Its Potential for Diversification," India Energy Forum, 25 pp.

Horner (Sep. 2019) "Understanding & Extracting the Latent Value in Coal," 7th Roundtable Conference on Coal, New Delhi, India, 23 pp.

Huang et al. (1996) "Effect of Solvent Characteristics on Coal Liquefaction," Preprints of Papers, American Chemical Society, Division of Fuel Chemistry 41(3): 961-966.

Humphreys et al. (2012) "The Catalytic Hydrothermal Reactor Technology, Cat-HTR," Perspectives on Brown Coal 3: 3 pp.

Humphreys et al. (2012) "The Catalytic Hydrothermal Reactor Technology, Cat-HTR," Perspectives on Brown Coal, pp. 6-7.

Ignite Energy Resources (2009) "Transforming low-cost brown coal into high-valued fuels," pp. 1-31.

India First Examination Report issued Oct. 11, 2021 in IN 202017009734.

India Notice of Hearing & Objections issued Jun. 9, 2022 in IN 202017009734.

International Preliminary Report on Patentability, dated Mar. 26, 2020, corresponding to International Application No. PCT/US2018/050690 (filed Sep. 12, 2018), 7 pp.

International Search Report and Written Opinion, dated Jun. 5, 2020, corresponding to International Application No. PCT/US2020/022338 (filed Mar. 12, 2020), 8 pp.

(56) References Cited

OTHER PUBLICATIONS

International Search Report and Written Opinion, dated May 12, 2020, corresponding to International Application No. PCT/US2020/022300 (filed Mar. 12, 2020), 8 pp.

International Search Report and Written Opinion, dated Nov. 7, 2018, corresponding to International Application No. PCT/US2018/050690 (filed Sep. 12, 2018), 8 pp.

Japanese Notice of Rejection issued Jul. 26, 2022 in JP 2020-515212.

Kershaw (1989) "Supercritical Fluids in Coal Processing," The Journal of Supercritical Fluids 2(1): 35-45.

Kershaw et al. (1984) "Extraction of Australian Coals with Supercritical Water," CSIRO Division of Applied Organic Chemistry, pp. 101-111.

Kershaw et al. (1993) "Structural Characterization of Coal-Tar and Petroleum Pitches," Energy & Fuels 7(3): 420-425.

Kobe Steel, Ltd. "Introduction of Hyper-coal," pp. 1-6 (at least as early as Jun. 11, 2018).

Li et al. (2003) "Effect of Acid Treatment on Thermal Extraction for 'Hypercoal' Production," Fuel Chemistry Division Preprints 48(1): 455-456.

LP Amina (2014) "Efficiency Improvements Through Emerging Polygeneration Technologies," International Advanced Coal Technology Conference 2014, Brisbane, Australia: 1-13.

Maciel et al. (2009) "Separating Asphaltenes from Lube Oil Through Supercritical Deasphalting Considering Experimental and Virtual Plants and Thermodynamic Analysis," 10th International Symposium on Process Systems Engineering: 771-776.

Making a New Pitch for Coal, The University of Utah, available online at https://unews.utah.edu/making-a-new-pitch-for-coal/, [posted Oct. 2016].

Maschmeyer (2012) "Current and Future Maritime Fuels," Sustainable Maritime Fuels Forum, pp. 1-22.

Meyer (1991) "The Charfuel® Coal Refining Process," Proceedings of the sixteenth biennial low-rank fuels symposium: 448-474.

Myers et al. (Sep. 2017) "Attractiveness of Wyoming Powder River Basin (PRB) coal as a valuable resource from which to manufacture non-energy and fuel products," 2017 International Pittsburgh Coal Conferences, Pittsburgh, Pa, USA, Sept. 5-8, 2017, 16 pp.

Okuyama et al. (2004) "Hyper-coal process to produce the ash-free coal," Fuel Processing Technology 85(8-10): 947-967.

Ouchi et al. (1989) "Pyridine extractable material from bituminous coal, its donor properties and its effect on plastic properties," Fuel 68(6): 735-740.

Overview of Crude Units, pp. 1-35 (2002).

Rahman et al. (2013) "Production and characterization of ash-free coal from low-rank Canadian coal by solvent extraction," Fuel Processing Technology 115: 88-98.

RAMACO Carbon (Jun. 2017) "'Coal to Cars' and a Few Other Things," 29 pp.

Ross et al. (1990) "The effects of hydrothermal treatment on Wyodak coal," Preprints of Papers—American Chemical Society, Division of Fuel Chemistry 35(2): 352-363.

Rotary Kiln, Source: https://en.wikipedia.org/wiki/Rotary_kiln?oldid=686121940, pp. 1-4. Accessed at least as early as Jun. 11, 2018.

Sasol (2011) "Future, now: Sasol Technology research and development," 17 pp.

Sherwin-Williams "Firetex® M90/03 Hydrocarbon Fire Protection Epoxy," available online at https://protective.sherwin-williams.com/detail.jsp?A=sku-26094%3Aproduct-6807 [Accessed Feb. 6, 2018], 3 pp.

Shui et al. (2012) "Hydrothermal Treatment of a Sub-bituminous Coal and Its Use in Coking Blends," Energy Fuels 27: 138-144.

Steinberg (1987) "The Flash Hydropyrolysis and Methanolysis of Coal With Hydrogen and Methane," Int. J. Hydrogen Energy 12(4): 251-266.

Sundaram et al. (1983) "Enhanced Ethylene Production via Flash Methanolysis of Coal," Process Sciences Division Department of Applied Science Brookhaven National Laboratory: 129-140.

Sundaram et al. (1986) "The direct use of natural gas in coal liquefaction," Prepr. Pap., Am. Chem. Soc., Div. Fuel Chem. 31(4): 77-84.

Tatterson et al. (1988) "Coal Flash Pyrolysis in a Free-Jet Reactor," Ind. Eng. Chem. Res. 27(9): 1606-1613.

U.S. Department of Energy Pittsburgh Energy Technology Center (1995) "Final Report on Design, Capital Cost and Economics for the Low Rank Coal Study," vol. 1A, 182 pp.

U.S. Department of Energy Pittsburgh Energy Technology Center (1995) "Final Report on Design, Capital Cost and Economics for the Low Rank Coal Study," vol. 1B, 182 pp.

U.S. Department of Transportation, Federal Highway Administration (Oct. 2016) Tech Brief, Automated High-Performance Liquid Chromatography Saturate, Aromatic, Resin and Asphaltene Separation, FHWA Publication No. FHWA-HRT-15-055.

Urethane Systems Plus, Inc. "Reaction Injection Molding Services," available online at http://www.urethanesp.com/reaction-injection-molding-services.html, [Accessed Feb. 6, 2018], 2 pp.

USDOE Hydrogenates Coal with Methane, [2010] West Virginia Coal Association, available online at http://www.wvcoal.com/research-development/usdoe-hydrogenates-coal-with-methane.html, 2 pp.

Van Bibber et al. (2007) "Baseline Technical and Economic Assessment of a Commercial Scale Fischer-Tropsch Liquids Facility," National Energy Technology Laboratory: 1-76.

Wikispaces "Vacuum distillation in petroleum refinery," 2 pp. Accessed at least as early as Jun. 11, 2018.

Winslow et al. (2009) "Direct Coal Liquefaction Overview Presented to NETL," Leonardo Technologies, Inc., 110 pp.

Work (1966) "The FMC Coke Process," Journal of Metals 18: 635-642.

Yang et al. (publicly available May 2016) "Preparation of pitch based carbon fibers using Hyper-coal as a raw material," Carbon (Sep. 2016) 106: 28-36.

Yoshida et al. (2002) "The effect of extraction condition on 'HyperCoal' production (1)—under room-temperature filtration," Fuel 81(11-12): 1463-1469.

Yoshida et al. (2004) "Effect of extraction condition on 'HyperCoal' production (2)—effect of polar solvents under hot filtration," Fuel Processing Technology 86(1): 61-72.

Japan Final Notice of Rejection issued Apr. 25, 2023 in JP2020-515212.

Requisition by Examiner issued Jun. 30, 2025 corresponding to Canadian Patent Application No. 3,133,236.

\* cited by examiner

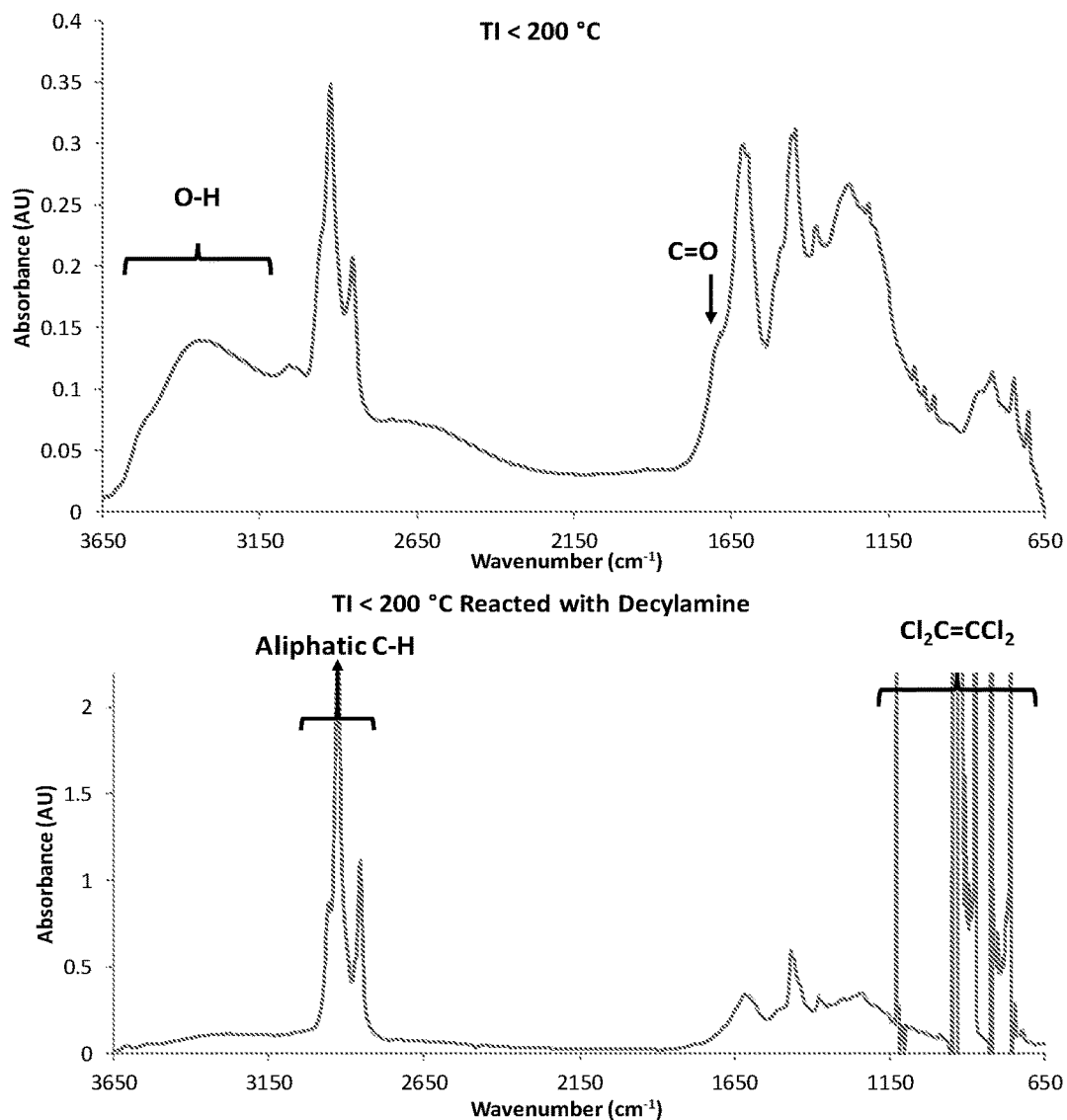
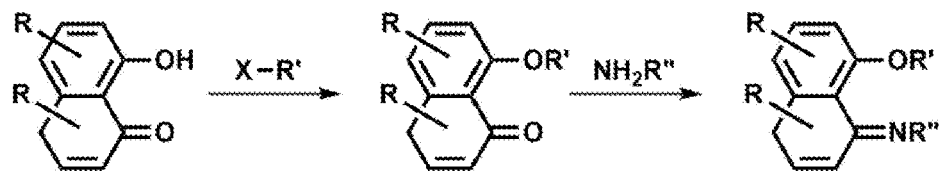
FIG. 13

HIGH VALUE PRODUCTS DERIVED FROM COAL-BASED FEEDSTOCKS

CROSS-REFERENCE TO RELATED APPLICATIONS

This patent application is a U. S. National Stage Application filed under 35 U.S.C. § 371 of International Application Serial No. PCT/US2020/022338, filed Mar. 12, 2020, which application claims the benefit of priority to: U.S. Provisional Patent Application No. 62/817,205 filed Mar. 12, 2019; and U.S. Provisional Patent Application No. 62/817,754 filed Mar. 13, 2019, each of which is hereby incorporated by reference in its entirety to the extent not inconsistent with the description herein.

BACKGROUND OF THE INVENTION

Coal mining and production represents a large, valuable industry in both the United States and abroad. The vast majority of this coal is combusted to generate energy. Currently, there is a great deal of economic and political pressure to repress the construction of new coal-fired power plants, and the number of power plants is declining. Accordingly, to further utilize coal beyond combustion, it becomes increasingly attractive to investigate its use as a feedstock for other processes, including for the production of chemicals, plastics, building materials and products which may have significantly higher value than that of the energy produced by power plants.

Research and development into coal as a feedstock for the generation of chemicals and other materials has been around for more than 100 years. Interest in this field has typically increased during periods in which traditional petroleum feedstocks have become expensive due to high oil prices, such as in the 1970's. For example, U.S. Pat. No. 4,346,077 discusses pyrolysis of coal to generate liquid hydrocarbons and vapors. U.S. Pat. No. 9,074,139 describes generation of aromatic compounds from coal utilizing liquefaction and hydrocracking. Common amongst these references and most coal conversion technology is that coal is being converted into coal tars to mimic petroleum hydrocarbons in such a way that it can then be processed through a petroleum refinery. Coal, which compared to petroleum, is hydrogen deficient, contains more oxygen, generates a greater amount of solid products, and can contain a high sulfur content and some metals. Thus coal often makes a relatively poor substitute for processes designed for oil-based feedstocks.

Coal tar pitch was used for asphalt paving applications until the 1960-1970s in many parts of the world. The major drawback to using coal tar pitch—produced from the pyrolysis of coal—is that it is highly enriched in polycyclic aromatic hydrocarbon (PAH) molecules, which have a high toxicity and carcinogenic potential. During paving operations, PAHs are released under the high temperatures used to melt the pitch during mixing with aggregates, laying and compacting. This poses an immediate risk to workers and those in the general vicinity. Furthermore, over the long term, PAHs can leach out of the pavement into the environment.

Asphalt, also known as bitumen in many places outside the United States, is one of the most recycled materials in the world. Old roads are often milled to produce reclaimed asphalt pavement (RAP) which gets blended with fresh asphalt binder and relayed to make new pavement. This helps reduce the amount of new asphalt binder, rock aggregate and fines that are needed for the construction of pavements. From a sustainability standpoint, it is important that any new additives be compatible with petroleum asphalt binders already used.

From an asphalt binder standpoint, it is desirable to produce additives from coal that are highly soluble in toluene. It is possible to produce materials that are soluble in solvents like dichloromethane or chlorobenzene, but these materials will partially blend with petroleum based products, and typically cannot be in an excess of 5 wt % before causing significant compatibility issues. Petroleum asphalt can typically handle much higher levels of toluene-soluble and heptane-insoluble material up to 30%. In the case of roofing asphalt, the amount can go as high as 45%.

PCT application no. PCT/US2018/050690, filed Sep. 12, 2018 and published as International Publication Application No. WO 2019/055529 on Mar. 21, 2019, is directed to systems, methods and process conditions for making high value products from feedstocks derived from coal using a combination of solvent extraction and pyrolysis processes. The methods and systems of this reference are characterized as high branched, thereby potentially providing a commercially feasible process for generation of diverse classes of intermediate and finished high value products including chemicals, polymer composite products, agricultural materials, building materials carbon fiber and graphene products.

It can be seen from the foregoing that there remains a need in the art for systems and methods for improved asphalt binders and modifiers.

BRIEF SUMMARY OF THE INVENTION

Provided herein are systems and methods for the production of high value products from a coal-based feedstock. The high value products may be end products or they may be intermediate products. In general, the high value products have higher phenolic content, higher oxygen content, lower PAH content, and/or may be more polyfunctional than the coal-based feedstock.

In one embodiment a method of processing a coal-based feedstock to a high value product, the method comprises the steps of: contacting the coal-based feedstock with one or more solvents under non-pyrolytic conditions thereby generating a liquid phase; and fractionating the liquid phase to generate at least two fractions under conditions such that at least one of the fractions is the high value product. In one embodiment, the liquid phase comprises 5 to 25 wt % oxygen and at least 50% of the oxygen in the liquid phase is in the form of phenolic, carboxylic and ketone functional groups of hydrocarbon-based compounds.

In one embodiment, a method of production of high value products from a coal-based feedstock may include extractions of coal via esterification methods using acylchlorides and organic amine bases like pyridine or quinoline, as detailed below. It has been found that side reactions and/or conditions may be important in achieving a higher efficacy extraction of the coal in this solvent system.

In one embodiment, the high value product may be an asphalt binder, or a component thereof. In one embodiment, the high value product may be an asphalt Rejuvenator, or a component thereof, to improve asphalt recycling. In one embodiment, the high value product may be an asphalt PG Booster or a component thereof. In one embodiment, the high value product may be an asphalt additive, or a component thereof, with antistrip properties. In one embodiment, the high value product may be an asphalt additive, or a component thereof, to improve compaction. In one embodiment, the high value product may be an asphalt additive, or a component thereof, to lower production and application temperatures. In one embodiment, the high value product may be an asphalt additive, or a component thereof, to produce a hard-grade asphalt/bitumen. In one embodiment, the high value product may be an asphalt additive, or a component thereof, to compatibilize asphaltenes. In one embodiment, the high value product may be an asphalt additive, or a component thereof, to improve ΔTc. In one embodiment, the high value product may be an additive, or a component thereof, to compatibilize plastics. In one embodiment, the high value product may be an oligomer. In one embodiment, the high value product may be a polymer. In one embodiment, the high value product may be a resin.

In one embodiment, the method may improve the solubility and low temperature properties of asphalt additives by employing alkyl chain length diversity, branched alkyl chains, unsaturated alkyl chains, or cyclic alkyl groups.

In one embodiment, the high value product may be a roofing binder (or coating), or component thereof, produced directly from coal extract without fractionation. In one embodiment, the high value product may be a roofing binder (or coating), or component thereof, produced from coal extract fractions. In one embodiment, the high value product may be a roofing binder (or coating), or component thereof, produced from coal extract or fractions upon mild oxidation. In one embodiment, the high value product may be a material to stiffen asphalt binders, or fluxes, to make it roofing grade coating. In one embodiment, the high value product may be an accelerated stiffening agents with mild oxidation. In one embodiment, the high value product may be an asphalt additive, or a component thereof, that is used to stiffen paving grade asphalts to produce roofing binder (or coatings). In one embodiment, the high value product may be an asphalt additive, or a component thereof, to stiffen fluxes to produce roofing binder (or coatings).

In a preferred embodiment, a method of production of high value products from a coal-based feedstock may include performing one or more reactions on tetralin coal extracted residue. Without wishing to be bound by theory, it is believed that the tetralin extraction process may render the remaining coal more active towards additional chemistry.

In some embodiments of the method, high amounts of coal-based feedstock may be extracted using a fatty amine. In one embodiment, the fatty amine is decylamine. The decomposition of the fatty amine may be leveraged to increase the fraction of the coal that may be extracted. The decomposition of the fatty amine may take place during the contacting step. In some embodiments, decomposition of the fatty amine may include controlling the temperature of the coal-based feedstock/fatty amine to 200-450° C.

Without wishing to be bound by theory, some of the reactions that take place are believed to involve the fatty amine at coal O—H sites because 31P NMR shows that there are no longer any reactive O—H. Furthermore, FTIR shows a large decrease in the intermolecular H-bonding by, and additionally the material is highly soluble in toluene and most of it is soluble in heptane. There is some incorporation of nitrogen into the resulting products by CHNOS, but there is not enough nitrogen to account for reacting with all the oxygen groups. GCMS analysis of the distillates after the reaction shows the presence of primarily C8-C12 and C18-C22 which is from the decomposition of the decylmaine and also the chain transfer of one decomposed decylamine to another decylamine to make the C18-C22 range material. GCMS also shows the presence of decylnitrile which is decomposition of the amine and may also indicate some hydrogen transfer from the amine to the coal to form the nitrile. From these results show hydrogen transfer from the amine to the coal and some alkyl chain transfer from the amine to the coal.

In some embodiments, methods of production of high value products from a coal-based feedstock may include extracting liquids from the tetralin extracted coal waste product.

In some embodiments, the high value product may be a component of Asphalt. The described systems and methods allow for the reduction or elimination of harmful chemical components common in asphalt, including polycyclic aromatics, while providing the economic benefits of using a coal feedstock over other more expensive alternatives, including petroleum. The systems and methods provided herein may utilize solvent extraction, pyrolysis or a combination of both solvent extraction and pyrolysis (i.e. thermochemical processing).

In one embodiment, wherein the liquid phase comprises not greater than 500 ppm small polycyclic aromatic hydrocarbons (PAH), wherein small polycyclic aromatic hydrocarbons is defined as PAH compounds having 4 or less fused aromatic rings. In one embodiment, the liquid phase comprises not greater than 200 ppm small polycyclic aromatic hydrocarbons. In one embodiment, the liquid phase comprises not greater than 100 ppm small polycyclic aromatic hydrocarbons. In one embodiment, the liquid phase comprises not greater than 50 ppm small polycyclic aromatic hydrocarbons. In one embodiment, the liquid phase comprises not greater than 50 ppm phenanthrene.

In one embodiment, at least 60% of the oxygen in the liquid phase is in the form of phenolic, carboxylic and ketone functional groups of hydrocarbon-based compounds. In one embodiment, at least 70% of the oxygen in the liquid phase is in the form of phenolic, carboxylic and ketone functional groups of hydrocarbon-based compounds. In one embodiment, at least 80% of the oxygen in the liquid phase is in the form of phenolic, carboxylic and ketone functional groups of hydrocarbon-based compounds.

In some embodiments the contacting step may comprise generating a liquid phase comprising at least one aromatic hydrocarbon having an oxygen-containing functional group. The oxygen-containing functional group may comprise a hydroxyl group, a ketone group, and/or a carboxylic group. In some embodiments the contacting step may comprise esterification of the oxygen-containing functional group of the at least one aromatic hydrocarbon. In some embodiments the contacting step may comprise condensation of the oxygen-containing functional group of the at least one aromatic hydrocarbon. In some embodiments the contacting step may comprise amidification of the oxygen-containing functional group of the at least one aromatic hydrocarbon. In some embodiments the contacting step may comprise amine coupling of the oxygen-containing functional group of the at least one aromatic hydrocarbon. In some embodiments the contacting step may comprise phosphorylation of the oxygen-containing functional group of the at least one aromatic hydrocarbon. In some embodiments the liquid phase is soluble in asphalt.

In some embodiments, the step of contacting the coal-based feedstock with one or more solvents comprises extracting the coal-based feedstock with the one or more solvents, chemically reacting the coal-based feedstock with the one or more solvents or any combination thereof. In some embodiments, the one or more solvents are one or more of an aliphatic solvent, an aromatic solvent, a polar solvent, a hydrogen donating solvent and/or any combination of these. In some embodiments, the one more solvents are tetralin (1,2,3,4-Tetrahydronaphthalene), 1-methylnapthalene, dimethylformamide (DMF), decylamine, dimethyl sulfoxide, toluene, carbon disulfide, N-methyl-2-pyrolidone, tetrahydrofuran, primary amines such as ethylamine through fatty amines of up to C28, diamines such as ethylene diamine, triamines, amides, bio-oils, anhydrides, ethylene glycol, fatty acids, gasoline, diesel, glycerol, aromatic refinery fractions, marine fuel oil or any combination of these.

In some embodiments, the solvent at least partially comprises one or more recycle streams derived from a coal treatment process, petrochemical process or any combination thereof. In some embodiments, the one or more solvents comprises a ratio of volume of solvent to volume of coal-based feedstock selected over the range of about 1:1 to about 20:1.

In some embodiments, the step of contacting the coal-based feedstock with one or more solvents is carried out for a duration selected from the range of about 1 minute to about 24 hours. In some embodiments, the step of contacting the coal-based feedstock with one or more solvents is carried out at a temperature selected from the range of about 30° C. to about 500° C. In some embodiments, the step of contacting the coal-based feedstock with one or more solvents is carried out at a temperature selected from the range of about 30° C. to about 400° C. In some embodiments, the step of contacting the coal-based feedstock with one or more solvents is carried out at a temperature selected from the range of about 30° C. to about 360° C. In some embodiments, the step of contacting the coal-based feedstock with one or more solvents is carried out at a temperature selected from the range of about 200° C. to about 500° C. In some embodiments, the step of contacting the coal-based feedstock with one or more solvents is carried out at a temperature selected from the range of about 2000° C. to about 400° C. In some embodiments, the step of contacting the coal-based feedstock with one or more solvents is carried out at a temperature selected from the range of about 2000° C. to about 360° C.

In some embodiments, the step of contacting the coal-based feedstock with one or more solvents is carried out at a pressure selected from the range of about 0.1 bar to about 500 bar. In some embodiments, the step of contacting the coal-based feedstock with one or more solvents is carried out at super critical fluid conditions.

In one embodiment the step of contacting the coal-based feedstock with one or more solvents may converts at least about 15 wt % of a solid coal-derived feedstock to the liquid phase. In one embodiment the step of contacting the coal-based feedstock with one or more solvents may converts at least about 30 wt % of a solid coal-derived feedstock to the liquid phase. In one embodiment the step of contacting the coal-based feedstock with one or more solvents may converts at least about 50 wt % of a solid coal-derived feedstock to the liquid phase. In one embodiment the step of contacting the coal-based feedstock with one or more solvents may converts at least about 75 wt % of a solid coal-derived feedstock to the liquid phase. In one embodiment the step of contacting the coal-based feedstock with one or more solvents may convert about 15 to about 90 wt % of the coal-derived feedstock to the liquid phase.

In one embodiment, the step of contacting the coal-based feedstock with one or more solvents of step (a) converts about 30 to about 90 wt % of the coal-derived feedstock to the liquid phase. In one embodiment, the step of contacting the coal-based feedstock with one or more solvents of step (a) converts about 40 to about 90 wt % of the coal-derived feedstock to the liquid phase. In one embodiment, the step of contacting the coal-based feedstock with one or more solvents of step (a) converts about 50 to about 90 wt % of the coal-derived feedstock to the liquid phase. In one embodiment, the step of contacting the coal-based feedstock with one or more solvents of step (a) converts about 70 to about 85 wt % of the coal-derived feedstock to the liquid phase.

In some embodiments, the contacting the coal-based feedstock with one or more solvents of step (a) is carried out as a flow through process, a batch process, a Soxhlet process, or any combination thereof.

In some embodiments, an asphalt binder comprising the high value product may be made by the processes described herein. In some embodiments, a roofing product comprising the high value product may be made by the processes described herein. In some embodiments, an asphaltene dispersant product comprising the high value product may be made by the processes described herein.

In one embodiment, the coal-based feedstock may be contacted with one or more amine bases to produce side reactions of the acylchloroides with the bases. These side reactions promote dimerization, olligomerization and polymerization of bases like quinoline and pyridine while also attaching ester groups. The addition of the coproducts had a beneficial effect on improving the compatibility of the coal extract ester products in asphalts.

In one embodiment, the coal-based feedstock is at least partially derived from subbituminous coal or a derivative thereof. In one embodiment, the coal-based feedstock is generated by thermal treatment of coal or a derivative of thermally treated coal. In one embodiment, the coal-based feedstock is generated by solvent treatment of coal or a derivative of thermally treated coal. In one embodiment, the coal-based feedstock is generated by mechanical processing of coal or a derivative of mechanically processed coal. In one embodiment, the coal-based feedstock is generated to be toluene-soluble. In one embodiment, the coal-based feedstock is generated to be heptane-soluble. In one embodiment, the coal-based feedstock is generated to produce more than 50% polyphenols.

In one embodiment, the contacting step comprises: contacting the coal-based feedstock with an acyl chloride in the presence of an organic base; esterifying at least some of the coal-based feedstock to produce an ester product; polymerizing at least some of the organic base to produce a polymerized coproduct; wherein the high value product comprises the ester product and the polymerized coproduct.

In one embodiment, the organic base is pyridine, quinoline or combinations thereof.

In one embodiment, an asphalt product comprises the high value product made via claim the methods described herein.

In one embodiment, prior to the contacting step (a), activating the coal-based feedstock by extracting the coal based feedstock with a hydrogen donor solvent and removing the liquid. In one embodiment, the hydrogen donor solvent is tetralin. In one embodiment, the contacting step (a) comprises: exposing the coal-based feedstock to a fatty amine; decomposing at least some of the fatty amine; and converting at least 30 wt % of the coal-based feedstock from solid phase to liquid. In one embodiment, the fatty amine comprises decylamine. the contacting step (a) comprises: exposing the coal-based feedstock to a fatty amine; decomposing at least some of the fatty amine; and converting at least 40 wt % of the coal-based feedstock from solid phase to liquid. In one embodiment, the contacting step (a) comprises: exposing the coal-based feedstock to a fatty amine; decomposing at least some of the fatty amine; and converting at least 50 wt % of the coal-based feedstock from solid phase to liquid. In one embodiment, the contacting step (a) comprises: exposing the coal-based feedstock to a fatty amine; decomposing at least some of the fatty amine; and converting at least 60 wt % of the coal-based feedstock from solid phase to liquid. In one embodiment, the contacting step (a) comprises: exposing the coal-based feedstock to a fatty amine; decomposing at least some of the fatty amine; and converting at least 70 wt % of the coal-based feedstock from solid phase to liquid. In one embodiment, the contacting the coal-based feedstock with one or more solvents of step (a) is carried out at a temperature selected from the range of about 30° C. to about 450° C.

In one embodiment, the contacting the coal-based feedstock with one or more solvents of step (a) is carried out at a temperature selected from the range of about 30° C. to about 400° C. In one embodiment, the contacting the coal-based feedstock with one or more solvents of step (a) is carried out at a temperature selected from the range of about 30° C. to about 360° C. In one embodiment, the contacting the coal-based feedstock with one or more solvents of step (a) is carried out at a temperature selected from the range of about 200° C. to about 450° C. In one embodiment, the contacting the coal-based feedstock with one or more solvents of step (a) is carried out at a temperature selected from the range of about 200° C. to about 400° C. In one embodiment, the contacting the coal-based feedstock with one or more solvents of step (a) is carried out at a temperature selected from the range of about 200° C. to about 360° C. In one embodiment, the contacting the coal-based feedstock with one or more solvents of step (a) is carried out as a flow through process, a batch process, a Soxhlet process, or any combination thereof.

In one embodiment, an asphalt binder comprises the high value product made by the methods disclosed herein. In one embodiment, the high value product stiffens the asphalt binder. In one embodiment, a roofing product comprises the high value product made by the methods disclosed herein. In one embodiment, the roofing product is a roof coating product. In one embodiment, an asphalt rejuvenator may improve the characteristics of recycled asphalt, wherein the asphalt rejuvenator comprises the high value product made by the methods disclosed herein. In one embodiment, an antistrip additive comprises the high value product made by the methods disclosed herein. In one embodiment, a compaction modifying additive comprises the high value product made by the methods disclosed herein. In one embodiment, a melting temperature modifying additive comprises the high value product made by the methods disclosed herein. In one embodiment, a hard grade asphalt or bitumen comprises the high value product made by the methods disclosed herein. In one embodiment, an asphaltene compatabilizing additive comprises the high value product made by the methods disclosed herein. In one embodiment, an m-value modifying additive comprises the high value product made by the methods disclosed herein. In one embodiment, a ΔTc modifying additive comprises the high value product made by the methods disclosed herein. In one embodiment, a plastic compatabilizing additive comprises the high value product made by the methods disclosed herein. In one embodiment, an oligomer comprises the high value product made by the methods disclosed herein. In one embodiment, a polymer comprises the high value product made by the methods disclosed herein. In one embodiment, a resin comprising the high value product made by methods disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 12 shows an FTIR spectrum of <200° C. TI material using a solvent cast from pyridine (top), and FTIR spectrum taken in tetrachloroethylene of the <200° C. TI material reacted with decylamine (bottom).

FIG. 13 shows a reaction useful in producing a high value product from a coal-based feedstock, the reaction comprising sequential reaction of TI to form an ether at the phenolic position followed by a condensation Schiff base reaction at the carbonyl to form an imine.

DETAILED DESCRIPTION OF THE INVENTION

Figure 1:
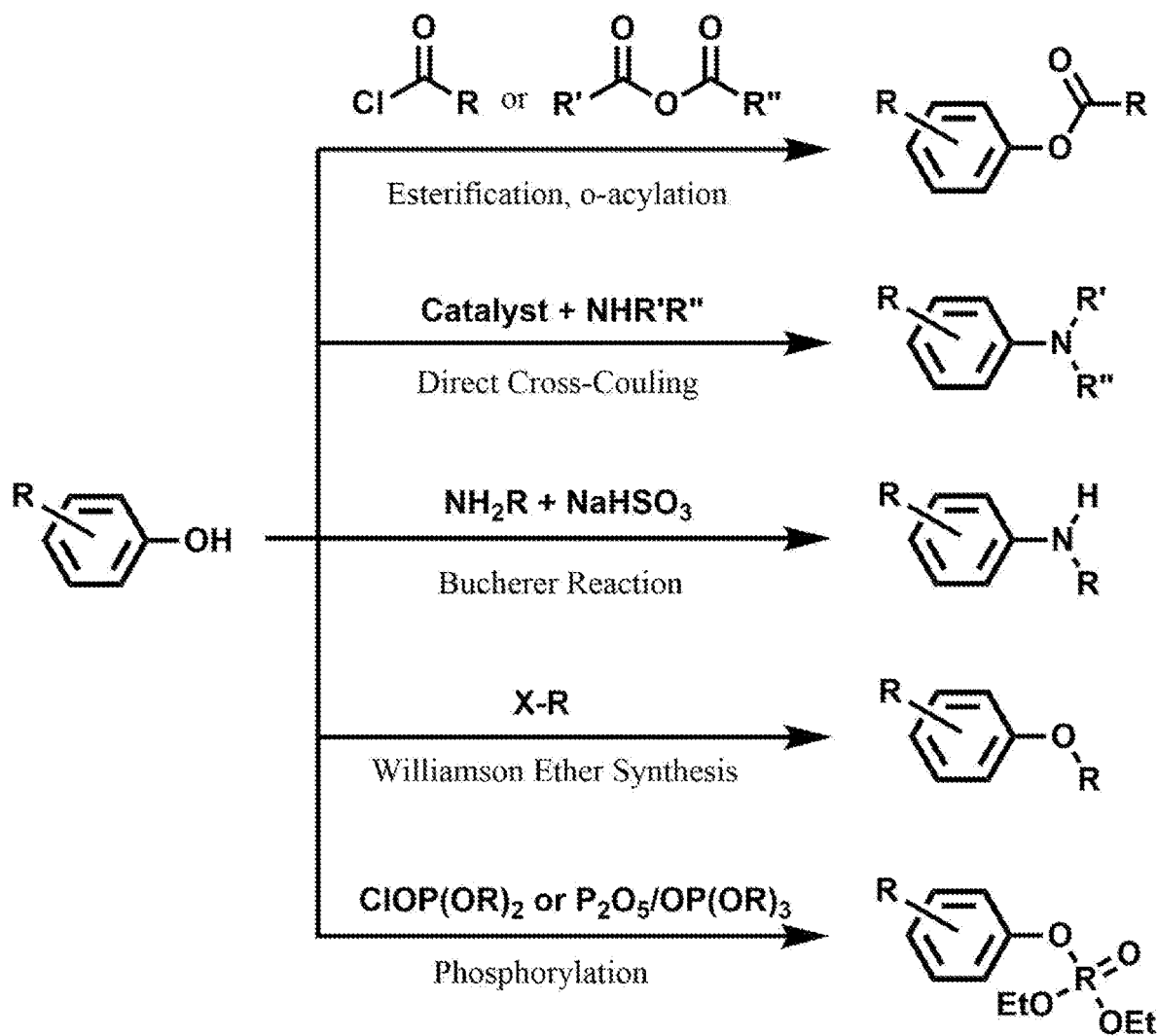
FIG. 1. shows a reaction scheme for useful reactions at the acidic proton of the phenolic oxygen for producing high value products from a coal-based feedstock.

In general, the terms and phrases used herein have their art-recognized meaning, which can be found by reference to standard texts, journal references and contexts known to those skilled in the art. The following definitions are provided to clarify their specific use in the context of the invention.

As used herein, "coal-based feedstock" refers to feedstock at least partially derived from coal. A coal-based feedstock includes a solid, powder, slurry, liquid, fluid mixture or other material that has been generated at least in part from a coal source, such as run of mine coal source. For example, coal may be crushed into a powder prior to processing. A coal-based feedstock may be subject to various physical, thermal and chemical treatments known in the art to further facilitate processing of the feedstock, for example, by thermal treatment, mechanical treatment and/or chemical treatment. A coal-based feedstock may be subject to heating under non-pyrolytic conditions and/or solvent extraction treatments. The feedstock may also act as a recycled stream from one or more of the downstream processes or intermediates (e.g. solid material remaining after solvent extraction) so that additional products, such as liquid products, may be promoted by reprocessing less valuable or unwanted intermediate products.

"Coal" refers to predominately solid hydrocarbons that may contain some amount of fluid material. Coal is generally composed of hydrogen, carbon, sulfur, oxygen and nitrogen. Coal, as described herein, may refer to bituminous coal, subbituminous coal and lignite. Coal may also refer to ash or peat.

"Flash Pyrolysis" as described herein, refers to a thermal process in which a feedstock or intermediate product is exposed to sufficient energy to rapidly heat the feedstock or intermediate. Flash pyrolysis may, for example, provide heat or heat the material being processed to pyrolytic temperatures of greater than 750° C., greater than 900° C., greater than 1050° C., or optionally, greater than 1200° C. Flash pyrolysis may refer to a heating or resonance time of less than 60 seconds, less than 10 seconds, less than 5 seconds, less than 1 second, or optionally, less than 0.5 seconds. Flash pyrolysis may be performed in a vacuum, in the presence of air, or optionally, in the presence of a purified gas such as hydrogen or methane or syngas. It may also be performed in an inert atmosphere notably at very high temperatures greater than 1200° C.

"Non-pyrolytic conditions" as described herein, refers to a thermal process in which a feedstock or intermediate product is contacted with a solvent or reagent and controlled to a maximum temperature that is below pyrolytic temperature of the feedstock or intermediate product. In some embodiments, non-pyrolytic conditions may refer a temperature selected from the range of about 30° C. to about 450° C. Optionally, the temperature of a non-pyrolytic thermal process may be controlled to less than about 360° C. In some embodiments, the concentration of PAHs in the resulting product may depend on the temperature, with temperatures below about 360-400° C. being the most useful for limiting PAH content in high value product. In some embodiments, non-pyrolytic conditions may include brief temperature excursions above 360, 400 or even 450° C., such excursions being of a sufficiently short duration so as to avoid excessive PAH concentration in the liquid fraction. For example, non-pyrolytic conditions may include a temperature excursion from 450 to 550° C. for a period of 0.1 seconds to 1,000 seconds.

"Small polycyclic aromatic hydrocarbons" refers to small polycyclic aromatic hydrocarbons is defined as polycyclic aromatic hydrocarbons (PAH) compounds having 4 or less fused aromatic rings.

"Solvent extraction" refers to the process of contacting a feedstock or intermediate product with a solvent to facilitate the extraction and/or transformation of components of the material via chemical reaction and/or mass transfer via solubility in the solvent. In some embodiments, solvent extraction is carried out by flowing a liquid solvent or mixture of solvents through, or across, a feedstock or intermediate product. In some embodiments, the extraction is carried out in a Soxhlet apparatus. In some embodiments, solvent extraction is carried out as a batch process by bringing a feedstock or intermediate product in physical contact with one or more solvents. As described herein, solvent extraction may utilize one or more solids in one or more solvent extraction steps, including in multistage solvent extractions in which the same or similar solvents are repeatedly used on a material. Solvents, as described herein, may be mixtures including mixtures of liquid hydrocarbons generated by the processes described herein. Solvents, as described herein, may be mixtures of a number of solvents. Solvents may be recycled and reused as is known in the art. Solvent extraction may be at subcritical temperatures. Solvent extraction may be performed at reduced pressures, atmospherics pressures or increased pressures. Solvent extraction may be at carried out at supercritical pressures and temperatures.

"Solvent" as described herein refers to a liquid or a mixture of liquids having solubility and/or reactivity with regard to hydrocarbons or other species and molecules present in coal or a feedstock derived from coal. Solvent may refer to a complex mixture of liquids, including hydrocarbon mixtures generally defined by boiling point ranges. Solvents may be polar, paraffinic, aromatic, alcohol, ionic, and/or hydrogen-donating in nature. In embodiments utilizing two or more solvents, solvents may be distinguished by composition, additives, molecular design, boiling point ranges or combinations thereof. In some embodiments, the solvent is tetralin (1,2,3,4-Tetrahydronaphthalene), 1-methyl-napthalene or dimethylformamide.

"High Value Coal Products" describe chemicals and materials (both solid and liquid) generated by the processes described herein that are more valuable than the coal or feedstock at least partially derived from coal. High value coal products may refer to liquid products generated from predominately solid coal. The high value coal products described herein may have a 1.5×, 2×, 3×, 5×, 10×, or optionally, at least 50× monetary value in comparison with the coal or raw coal material provided in the feedstock. High value coal products may refer coal products that are 1.5×, 2×, 3×, 5×, 10×, or optionally, at least 50× more valuable than the energy that would be produced via burning of the coal. High value coal products may refer to products that are not fuel (e.g. created for the purpose of burning to generate energy). Examples of high value coal products include polymers (e.g., polyurethane, polyesters, polyamides), high value chemicals (BTX, paraffins, olefins, asphaltenes), composite materials, carbon fiber, graphene, building materials, road, paving and roofing materials and soil amendments.

High value products may represent a fraction of the total material converted from the feedstock, for example, 50% of the total products on a dry basis, 70% of the total products on a dry basis, 80% of the total products on a dry basis, or optionally, 90% of the total products on a dry basis.

"Hydrogen rich environment" refers to an atmosphere comprising a large composition of available hydrogen. For example, the hydrogen rich environment may be rich in hydrogen gas and/or methane. Hydrogen rich environment may refer to an atmosphere comprising greater than or equal to 5 mole percent hydrogen, or in some embodiments, greater than or equal to 10 mole percent hydrogen. Hydrogen rich environment may refer to an atmosphere comprising greater than or equal to 50 mole percent methane, or in some embodiments, greater than or equal to 70 mole percent methane. Hydrogen rich environment may refer to an atmosphere comprising greater than or equal to 50 mole percent combined hydrogen gas and methane, or in some embodiments, greater than or equal to 70 mole percent methane combined hydrogen gas and methane. Hydrogen rich environment may refer to the atmosphere or conditions of a chamber or vessel in which pyrolysis is performed.

"Inert atmosphere" refers to an environment in which the gas phase is chemically inactive with the feedstock(s) present.

Pressure values described herein are provided as absolute pressure values, unless otherwise indicated.

Coal extracts can be produced from a variety of non-pyrolytic (<400° C.) coal liquefaction methods which produce materials with significantly lower amount of PAHs compared to traditional coking oven coal tar pitch which is generally produced around 1000° C. using mature highly aromatic coal feedstocks. Coal extracts derived from non-pyrolytic solvent extraction liquefaction procedures that contain very low levels of PAH compared to traditional pyrolytic coal tar pitch have been developed. These low levels of PAHs makes these materials amenable to paving, roofing, petroleum, additives, modifiers and other applications. Within these materials, there are specific subfractions which are enriched in oxygen functional groups—especially phenolic species—that are highly amenable to modification through simple chemistry. Modification of these oxygen functional groups allows these coal extracts to be selectively engineered into a variety of carbon materials useful for several different industries.

Some fractions from coal extracts, from non-pyrolytic processes, provide feedstocks amenable to asphalt paving applications due to their low levels of PAHs, relevant softening/melting point, and solubility. Due to the large concentration of hydroxyl functional groups, moderate amount ketone functional groups, and few carboxylic groups, these materials can be reacted to tune their properties. For paving applications, derivatization can be used to increase the coal extracts solubility and compatibility with a wide range of conventional asphalts, modulate the softening point of these materials, while also imparting improved performance of the asphalt binder. Selective modification can also be performed to engineer in other favorable properties into the material to address certain industrial needs, such as lowering the application temperature, improving compaction, increasing resistance to rutting, shoving, puncturing, increasing resistance to either thermal or fatigue cracking, water stripping resistance, increasing the resistance to raveling, the loss of granule adhesion, reduction in oxidation, rejuvenation or restoration of performance after field aging, increasing the rate of old pavement recycling, helping to facilitate multiple recycling cycles etc. Additional derivatives can be envisioned to produce materials suitable for surfactants, emulsifiers, asphaltene stabilizers, paraffin dispersants, functional oligomers, polymers, composites, epoxies, resins, polymer flooding materials, and ionic liquids.

In one embodiment, the high value products may comprise asphalt additives derived from modified coal extracts. After performing chemical modification to produce toluene-soluble derivatives, these were separated into heptane-soluble (HS) and heptane-insoluble (HIS). The HS is used to soften hard asphalt binders, RAP or reclaimed asphalt shingle binder (RAS). The materials which produce this softening effect may be referred to as rejuvenators. The HIS portion works well to improve upper temperature performance grade (PG) properties, and in some cases it can be engineered to improve both upper and lower temperature PG properties. Materials which produce this effect on the upper and/or lower temperature, or only the upper temperature without changing the lower temperature, of virgin asphalt binders will be referred to as a PG booster. Reactive coal extract fractions which stiffen significantly upon mild oxidation or derivatized extracts which significantly increase the upper PG of asphalt by more than 30° C. are useful for producing asphalt shingle coatings. These materials provide an alternative to air blowing which is energy intensive and produces a significant release of greenhouse gas emissions.

Subbituminous coal contains around between 25-10% oxygen in the form of mostly hydroxyl, carboxylic, carbonyl, and ether functional groups, decreasing in that order. For coal extracts, the types and amount of oxygen functional groups is dependent upon the coal source, the extraction type and the process conditions. In general, during non-pyrolytic solvent extraction, some of the oxygen containing coal functional groups, most especially carboxylic groups, undergo decomposition during liquefaction causing the two most abundant oxygen functional groups in extraction products to be phenolic and cyclic ethers, such as furans, along with some ketones and residual amounts of carboxylic acids. Phenols have an acidic O—H bond which can be easily reacted to add a variety of other chemical functional groups. For more complex mixtures that contain phenolic, carboxylic and ketone functional groups, these functional groups can be reacted systematically to add more than one type of new functionality. A wide variety of possible reactions can be performed at the oxygen positions, and even more can be envisioned to be carried out at various aromatic carbons in phenolic compounds. The acidic proton on the oxygen of the phenolic groups can be transformed into different products by condensation, polycondensation, esterification, transesterification, etherification, amidification, amine coupling, and phosphorylation. FIG. 1 shows a reaction scheme for useful reactions at the acidic proton of the phenolic oxygen for coal derived materials.

Systems and methods disclosed herein may be applied directly to coal or extracted coal left over from solvent extraction processes.

Example 1: PAH Content

Two types of solvent extraction were investigated to produce coal extracts: (i) using dimethylformamide (dmf) as a low reactivity solvent to physically extract some coal molecules at either ambient temperature or under Soxhlet extraction conditions; and (ii) exposing the coal to the hydrogen donor solvent tetralin at elevated temperatures in a flow through system. Tetralin donates hydrogen to the coal structure and extract smaller fragments from the coal. During this process naphthalene and other tetralin dehydrogenation products are formed.

After tetralin extraction, and as the extracted liquid begins to cool, precipitates (tetralin-insoluble=TI) are formed at different temperatures. Precipitation continues to occur until the liquid reaches ambient temperature. The precipitate at different temperatures have different chemical functionalities as measured by FTIR, elemental analysis, thermogravimetric analysis, proton nuclear magnetic resonance spectroscopy (NMR), reactive phosphorous (31P) NMR, fluorescence spectroscopy, size exclusion chromatography and laser desorption ionization mass spectroscopy. The TI fraction precipitated at above about 80° C., (also referred to herein as "the TIaa fraction" or "TIaa") was more aromatic, contained more oxygen, and significantly more phenols and poly-phenols than the TI fraction collected from the filtrate upon cooling to 80° C. (also referred to herein as "the TIa fraction" or "TIa"). These materials also have different molecular and physical properties, for example, TIaa has a higher Mettler Toledo softening point temperature than TIa. The tetralin-soluble (TS) material is the least polar material and contains the least amount of oxygen.

PAH analysis was performed on dmf and tetralin to study solvent selection and its effect on PAH concentration. In respect to the tetralin extraction processing conditions, the extraction was investigated at below pyrolysis and above pyrolysis. PAH analysis by gas chromatography mass spectroscopy (GCMS) for these various coal extracts and a paving grade coal tar pitch are shown in Table 1.

PAHs. For the tetralin extracts, the PAHs were concentrated in the tetralin-soluble (TS) fraction. this is because PAHs have good solubility in toluene, which has a Hansen solubility parameter of 18.2 MPa1/2 whereas tetralin has an even higher solubility parameter of 19.9 MPa1/2. The higher solubility parameter of the tetralin makes it a better solvent for dissolving PAHs than toluene. Therefore, the Ta and Taa fractions are very attractive for producing paving grade materials with low levels of PAHs. In all cases, solvent extracts have significantly lower PAHs present than traditional coal tar pitch which has more than 12 wt % of PAHs.

The PAH level in the tetralin fractions was investigated in greater detail with a calibration standard which encompassed a wider range of PAH molecules. At a limit of quantification at 0.4 ppm the amount of PAHs in the TI fractions remains very low and most of the extracted PAHs are present in the TS fraction (Table 2).

TABLE 1

PAH levels in a paving grade (PG 64) coal tar pitch, fractions of tetralin extracts and dmf extracts.

| | | Tetralin | | | | | |
| | | 360° C. | | | 500° C. | | |
| Compound | Coal Tar | TIaa | TIa | TS | TIa | TS | DMF |
| | | | ppm wt/wt | | | | |
|---|---|---|---|---|---|---|---|
| Acenaphthylene | 16 | <10 | <10 | <10 | <10 | <10 | <10 |
| Fluorene | 2050 | <10 | <10 | <10 | <10 | <10 | <10 |
| Phenanthrene | 14800 | <10 | 23 | <10 | 22 | 47 | 17 |
| Anthracene | 6200 | <10 | <10 | <10 | <10 | 64 | <10 |
| Pyrene | 22000 | <10 | 66 | 30 | 67 | 110 | <10 |
| Benzo[a]anthracene | 17700 | <10 | <10 | <10 | <10 | <10 | <10 |
| Chrysene | 16500 | <10 | <10 | <10 | <10 | <10 | <10 |
| Benzo[b]fluoranthene | 13400 | <10 | <10 | <10 | <10 | <10 | 41 |
| Benzo[k]fluoranthene | 5100 | <10 | <10 | <10 | <10 | 300 | 41 |
| Benzo[a]pyrene | 10500 | <10 | <10 | <10 | <10 | 102 | 62 |
| Indeno[1,2,3-cd]pyrene | 5200 | <10 | <10 | <10 | <10 | 40 | 80 |
| Dibenz[a,h]anthracene | 1500 | <10 | <10 | <10 | <10 | 40 | <10 |
| Benzo[g,h,i]perylene | 4000 | <10 | <10 | <10 | <10 | <10 | 107 |
| Total Above Detction Lim. | 118966 | | 89 | 30 | 89 | 593 | 348 |

Without wishing to be bound by theory, solvents with lone pairs of electrons, like dmf, may be known for their ability to preferentially extract aromatic compounds, including PAHs. Thus, the dmf extracts may show a higher concentration of PAH molecules than tetralin extraction. However, in some embodiments the level of PAHs in the dmf extracts are reduced by using solvents like toluene or dichloromethane which do not dissolve the dmf extracts but are sufficient to dissolve the PAHs. After removal of the dmf, the solids do not dissolve in solvents with a lower solubility parameter than dichloromethane (20.2 MPa$^{1/2}$). In other embodiments, the level of PAHs can be reduced by precipitating the dmf extracts with solvents of sufficiently lower solubility parameter than dmf (24.9 MPa$^{1/2}$) but with a solubility parameter greater than toluene (18.2 MPa$^{1/2}$).

Some tetralin extraction fractions contained more PAHs than other fractions, and processing the coal with tetralin at conditions above pyrolysis also increased the amount of

TABLE 2

Lower level quantification of PAHs of different tetralin extract fractions.

| | | PPM of PAHs | | |
| | Coal Tar | Tetralin Extraction 360° C. | | |
| PAH Compound | Pitch | TS | TIa | TIaa |
|---|---|---|---|---|
| Naphthalene | | 15 | 12 | 17 |
| Acenaphthylene | 16 | <0.4 | <0.4 | <0.4 |
| Acenaphthene | | <0.4 | <0.4 | <0.4 |
| Fluorene | 2050 | <0.4 | <0.4 | <0.4 |
| Phenanthrene | 14800 | <0.4 | <0.4 | <0.4 |
| Anthracene | 6200 | <0.4 | <0.4 | <0.4 |
| Fluoranthene | | 16 | 0.83 | <0.4 |
| Pyrene | 22000 | 22 | 1.2 | <0.4 |
| Benzo[a]anthracene | 17700 | 29 | 1.3 | <0.4 |
| Chrysene | 16500 | 17 | 1.6 | <0.4 |

TABLE 2-continued

Lower level quantification of PAHs of different tetralin extract fractions.

| | | PPM of PAHs | | |
| | Coal Tar Pitch | Tetralin Extraction 360° C. | | |
| PAH Compound | | TS | TIa | TIaa |
| --- | --- | --- | --- | --- |
| Benzo[b]fluoranthene | 13400 | <0.4 | 1.5 | <0.4 |
| Benzo[k]fluoranthene | 5100 | 76 | 1.7 | <0.4 |
| Benzo[a]pyrene | 10500 | 11 | 1.2 | <0.4 |
| Dibenz[a,h]anthracene | 1500 | <0.4 | <0.4 | <0.4 |
| Benzo[g,h,i]perylene | 4000 | <0.4 | <0.4 | <0.4 |
| Indeno[1,2,3-cd]pyrene | 5200 | 15 | <0.4 | <0.4 |
| Total (not Naphthalene) | 118966 | 186 | 9.33 | — |

Methods of Asphalt Blending and Testing

Coal extracts, when appropriate, and derivatized coal extracts, were separated into HS rejuvenators and HIS PG boosters. Blends were prepared between 140-200° C. using magnetic stirring or high shear mixing under an inert atmosphere (nitrogen or argon) or under ambient atmosphere for 30 minutes to 1 hour. HIS materials were blended with virgin (or unaged) binders and the upper PG was measured by 25 mm plates on a dynamic shear rheometer (DSR) according to AASHTO T 315. The lower temperature properties were measured by four-mm DSR (in accordance with US Department of Transpiration, Federal Highway Administration, Tech Brief, Four-mm Dynamic Shear Rheometry, FHWA Publication No.: FHWA-HRT-15-053) after aging using the Universal Simple Aging Test (USAT) equivalent to rolling thin film oven (RTFO) and 20 hr pressure aging vessel (PAV) conditioning (in accordance with US Department of Transpiration, Federal Highway Administration, Tech Brief, The Universal Simple Aging Test, FHWA Publication No.: FHWA-HRT-15-054). For the HS material, blends were prepared using SHRP core asphalts that were laboratory aged by standard RTFO (AASHTO T 240)+40 hour PAV (AASHTO R 28). The upper PG properties and lower temperature PG properties were measured on this material without additional conditioning.

Utilization of Coal Extracts without Modification

Major drawbacks from using oxygen rich molecules in asphalt, especially those containing O—H groups, is their compatibility in the asphalt and that they can participate in intermolecular Hydrogen-bonding (H-bonding). H-bonding (as well as acid-base interactions) leads to more specific structuring within the asphalt to enhance brittleness as well as leading to moisture damage due to competition of water molecules to disrupt H-bonding between the molecules, and especially the molecule to the rock aggregate interface. With respect to other oxygen groups like ketones, they affect the ability of different alkyl and aryl substituents attached to the carbonyl group from rotating freely, which increases brittleness. A diagnostic for increased oxygen content in asphalt binders is the decrease in the relaxation (m-value) properties measured by a bending beam rheometer or by a DSR. This is observed with naturally occurring oxidation which happens over the course of the pavement lifetime. Another mechanism by which the relaxation can be effected is by increasing the amount of asphaltenes in asphalt binder. Asphaltenes are the portion of asphalt which are insoluble in aliphatic solvents, like heptane, but soluble in aromatic solvents, like toluene. As the ability to relax stresses becomes poor this can easily be tracked by the difference between the continuous (or critical) low temperature stiffness (S) and continuous (or critical) m-value, this is known as $\Delta Tc$ ($\Delta Tc = T(S)critical - T(m)critical$). $\Delta Tc$ is being utilized as a way to gauge pavement embrittlement and predict cracking, it should be noted that this metric is not appropriate for polymer modified asphalt binder since the mechanical properties and relaxation become convoluted with the polymer properties.

For most paving applications in the US, a small $\Delta Tc$ is preferred (greater than −5). However, in many European markets several hard grade asphalts are currently being used in the base of a pavement, or intermediate layers of pavements, to increase the pavement structural strength to sustain very heavy traffic loads without having to increase the pavement thickness to uneconomical levels. These binders display a high stiffness modulus and very low $\Delta Tc$ (less than −5) under the pavement temperature range, but when used properly (not on the surface) they provide a fair degree of durability and cracking resistance. These hard grade materials generally consist of either hard straight run vacuum residues or blends of less hard residues with airblown materials, or else are multigrade bitumen derived from other chemical reactions. These hard and multigrade bitumen can have $\Delta Tc$ values as low as −30° C. or lower.

Example 2: Tetralin Extraction

In some embodiments, the TI material and some derivatives can be used to impart similar effects to air blowing and other processes to make multigrade bitumen and therefore may be amenable for formulation hard grade asphalt (or bitumen).

Without wishing to be bound by theory, it is believed that during liquefaction of coal, in the presence of a hydrogen donor solvent, like tetralin, some bonds in the coal macromolecular structure are degraded to produce smaller molecular fragments. During this process, hydrogen is transferred from the hydrogen donor tetralin molecules to the coal facilitating the formation of these smaller molecule fragments, while producing various forms of dehydrogenated tetralin species. It was found that after the liquefaction process, and as the extracted liquid begins to cool, precipitates are formed at different temperatures (tetralin-insoluble=TI). Precipitation continues to occur until the liquid reaches ambient temperature. The precipitate at different temperatures have slightly different chemical functionalities as measured by FTIR and elemental analysis. By FTIR, TI collected >about 80° C. (TIaa) was more aromatic and contained more carbonyl species than TI<about 80° C. (TIa). These materials also have different molecular and physical properties. TIaa has a higher melting temperature than TIa. GCMS analysis of the liquefaction residue after filtering and the TI also showed low levels of PAHs, aside from some contaminates from tetralin dehydrogenation. It was also found that if the liquefaction was performed under mild conditions below about 500° C., especially below pyrolysis conditions of about below about 480° C., preferably below 430° C., or more preferably below about 400° C., t or even more preferably below about 360° C., then the tetralin-soluble residue fraction after vacuum distillation also contained very little PAHs compared to traditional coal tars and coal tar pitches, which are generally produced during the pyrolysis of coal under an inert atmosphere. Additional non-pyrolyitic extraction coal liquids can be produced in batched reactors, through Soxhlet extraction methods, or by using a flow-through system that provides a low residence time of the solvents before it is replenished with fresh solvent. Flow through configurations provide sufficient quantities of liquefaction tetralin-soluble and TI material with low levels of PAHs.

Tetralin solvent extraction of coal was performed in a flow through unit that liquefies the coal under elevated pressure with the temperature was maintained around 360° C. As the liquefied material cools to around 80° C. some of this material precipitates which is collected on a filter (TI >80° C.aa) and as the liquid cools further to ambient temperature additional material becomes precipitated (TI<80° C.). After removing the TI<80° C. and distilling off the tetralin and naphthalene under vacuum, the residue was analyzed by GC-MS. As shown in Table 1, the residue contained very low levels of PAHs compared to a paving grade coal tar pitch with an upper PG of 64 degrees C. The coal tar pitch contained all of the major PAHs found in the EPA mix consisting of acenaphthylene, fluorine, phenanthrene, anthracene, pyrene, benzo[a]anthracene, chrysene, benzo[b]fluoranthrene, benzo[k]fluoranthene, benzo[a]pyrene, benzo[g,h,i]perylene, indeno[1,2,3-cd]pyrene, and dibenz[a,h]anthracene at levels of around 1,000 ppm to more than 15,000 ppm per PAH compound in addition to other PAH molecules. In contrast, the tetralin extraction distilled residue contained less than 10 ppm of most PAHs and about 23 ppm of phenanthrene and 30 ppm of pyrene. Other aromatic hydrocarbon species were identified as dehydrogenation products of tetralin and are thus mainly carryover contaminants Because of low levels of PAH molecules and relevant softening point, the tetralin extracted TS was blended at 10 wt % with asphalt. After blending, it was shown that the material had partial compatibility with asphalt at 180° C., but it was observed that not all of the TS dissolved in the asphalt. The PG results from the blend are shown in Table 3. The blend showed an increase in the upper temperature continuous PG but also a significant increase in the lower temperature PG and significant decrease in ΔTc. Without further modification, this material produces a modest increase in the upper temperature stiffness of the asphalt, but as with many modifiers, this is done while sacrificing the low temperature properties.

TABLE 3

Upper and lower temperature PG and continuous grade PG data for a Wyoming asphalt and the same asphalt blended with 10 wt % of TS.

| | | | Continuous Grade | | | |
| --- | --- | --- | --- | --- | --- | --- |
| | Upper | Lower | Low Temperature | | | |
| | PG | PG | m-value | S | ΔTc | PG |
| ARC BI0003-WY | 62.0 | −16.6 | −16.6 | −20.6 | −4.0 | 58-12 |
| 10% TS | 68.2 | −1.4 | −1.4 | −17.6 | −16.2 | 64-0 |

By itself, the TS fraction may be too stiff to be considered as a direct replacement for paving grade asphalt since it has an upper PG of around 80-100° C. However, upon deeper vacuum distillation, or formulation by blending in some additional heptane- or toluene-insoluble material from the TS, this material may be employed in asphalt shingle applications as an alternative to conventional air blown asphalts with an upper PG of around 110-140° C. Alternatively or additionally, an oxidation step may be used to produce the appropriate stiffness. Of the tetralin extracted fractions, the TS fraction appears the most sensitive towards oxidation. By taking TS and subjecting it to rolling thin film oven (RTFO) aging, the upper PG changed dramatically from 95° C. to 132° C., and upon RTFO and pressure aging vessel (PAV) aging the material became too stiff to load onto DSR plates (upper PG was greater than 160° C.).

More soluble fractions from the TS were investigated by extracting with heptane or toluene. The HS material was a light brown viscous oil with an upper PG of 44° C. and unaged low temperature m-value of −8° C. and S of −6° C. However, upon RTFO and PAV oxidation it became a black brittle solid with an upper PG in excess of 130° C. Size exclusion chromatography showed that this material had underwent additional reactions to dimerize, oligomerize or polymerize. The HS oils from TS may be employed as an accelerant for traditional air blowing of roofing fluxes to produce roofing coatings. The toluene-soluble fraction from the TS has an upper PG similar to paving grade asphalt at 68° C.

Figure 2:
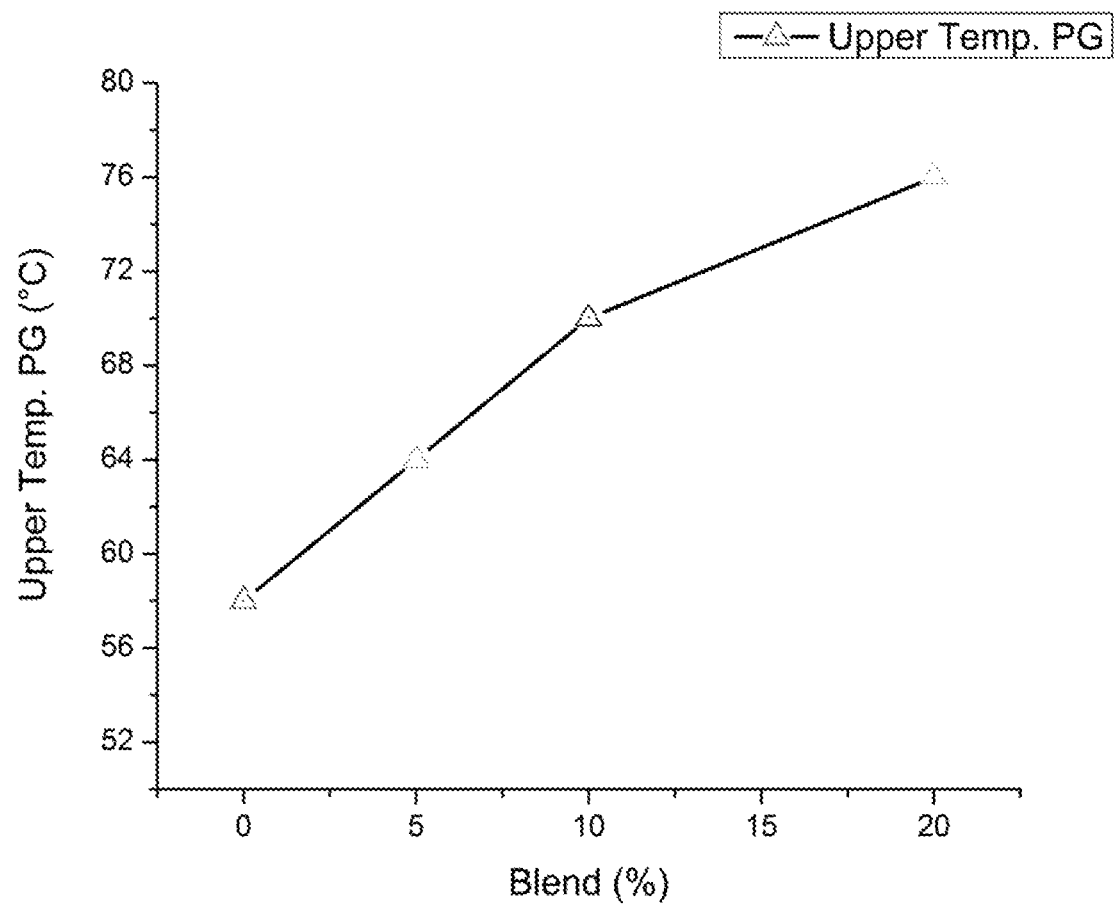
FIG. 2. Upper temperature continuous PG for a Wyoming asphalt with 0, 5, 10, and 20 wt % TIa, which melted at 180° C. in an oven.

In some embodiments, the melting point of the TIa produced from coal based raw materials is around 160-180° C. This makes the TIa fraction materials suitable for blending with asphalt since most hot mix asphalt is warmed to around 160-180° C., which is sufficient to melt the TIa allowing it to become well dispersed in the asphalt. Unmodified TIa was blended with a Wyoming asphalt at 180° C. which produced a significant stiffening effect on the asphalt. The Superpave upper continuous performance grade (PG) of the asphalt was a PG 58 and after blending with 10 wt % the TI it became a PG 70, this increased the upper temperature PG by 12° C. Additional blends were made at 5 and 20 wt % and the results on the upper temperature PG are shown in FIG. 2.

Figure 3:
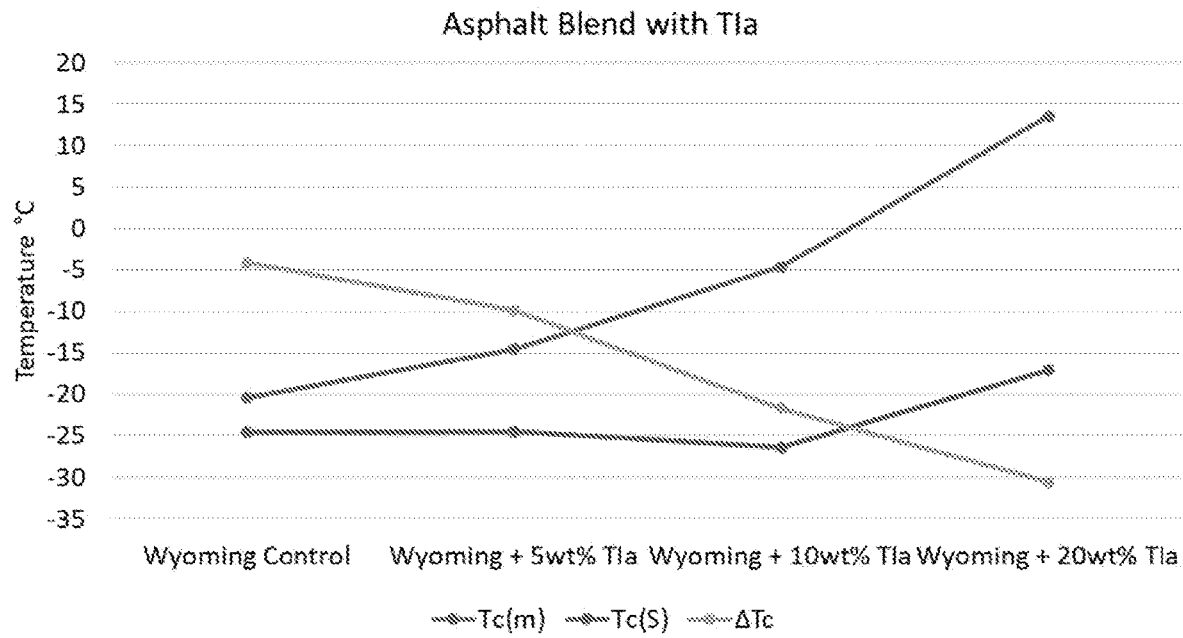
FIG. 3. Shows data for Continuous, low temperature PG m-value, S and ΔTc as a function of TIa concentration.

As with many non-polymeric, and even some polymeric additives, which are used to stiffen asphalt, the lower temperature PG of the TIa blends also increased with the addition of the modifier. FIG. 3 shows observed values for Tc(m), Tc(S) and ΔTc as a function of TIa content (wt %) of various asphalt blends having from 0 wt % to about 20 wt % TIa. It can be concluded from FIG. 3 that there is an increase in the m-value relative to the S, which is similar to what occurs during oxidation of asphalts, during air blowing during the manufacture of asphalt for roofing shingle manufacture, or during catalytic or pyrolytic upgrading of petroleum bottoms.

Air blown asphalts of the prior art produced for roofing shingles tend to have a large difference between the S and m-values (ΔTc<−30° C.). However, for paving grade asphalts a lower difference between the S and m-values is desirable since values below −5° C. indicate that the asphalt may be more susceptible to low temperature cracking, especially in colder climates. It has been found that via methods disclosed herein, the ΔTc may be improved by adding aliphatic chains to the TI through reactions using the various oxygen functional groups. Addition of the aliphatic side chains may also improve the solubility, melt properties and compatibility of the TI with the asphalt. The functional groups that are used to add these asphaltic side chains provide a route to increase the performance, especially towards moisture susceptibility at the asphalt rock interface (or stripping).

Esterification

In one embodiment, aliphatic side chains are added to phenolic 0-H groups via esterification. In some embodiments, esters may be produced by condensation reactions with fatty acids (alcohols can be used with carboxylic acids). In some embodiments, esters may be produced by reaction with anhydrides. In some embodiments, esters may be produced by reaction with acyl chlorides, optionally in the presence of a base. In the case of acyl chlorides addition of a base is helpful to scavenge HCl and promote the reaction, however reactions can also be performed without a base if HCl is allowed to escape the reaction.

In one embodiment, the coal-based feedstock may be contacted with one or more amine bases to produce side reactions of the acyl chlorides with the bases. These side reactions promote dimerization, oligomerization and polymerization of bases like quinoline and pyridine while also attaching ester groups. The addition of the coproducts had a beneficial effect on improving the compatibility of the coal extract ester products in asphalts.

Example 3: DMF Extract with Esterification Using Acyl Chloride and Organic Base

A Soxhlet apparatus was set up and dimethylformamide (DMF) was used under ambient atmosphere to extract coal material. After removal of the DMF, this material was insoluble in toluene and dichloromethane but mostly soluble in pyridine. As shown in Table 1, GCMS analysis of this material showed that it contained very little smaller PAHs. Phenanthrene was detected at 17 ppm and no other smaller (≤4 rings) PAHs were observed above 10 ppm. Some larger PAHs were detected: benzo[b]fluoranthene and benzo[k]fluoranthene together were 82 ppm, benzo[a]pyrene was 62 ppm, Indeno[1,2,3-cd]pyrene was 80 ppm, and Benzo[g,h,i]perylene was 107 ppm. In contrast a standard paving grade coal tar pitch contained all of the major PAHs found in the EPA mix consisting of acenaphthylene, fluorine, phenanthrene, anthracene, pyrene, benzo[a]anthracene, chrysene, benzo[b]fluoranthene, benzo[k]fluoranthene, benzo[a]pyrene, benzo[g,h,i]perylene, indeno[1,2,3-cd]pyrene, and dibenz[a,h]anthracene at levels of around 1,000 ppm to more than 15,000 ppm per PAH compound in addition to other PAH molecules.

Figure 4:
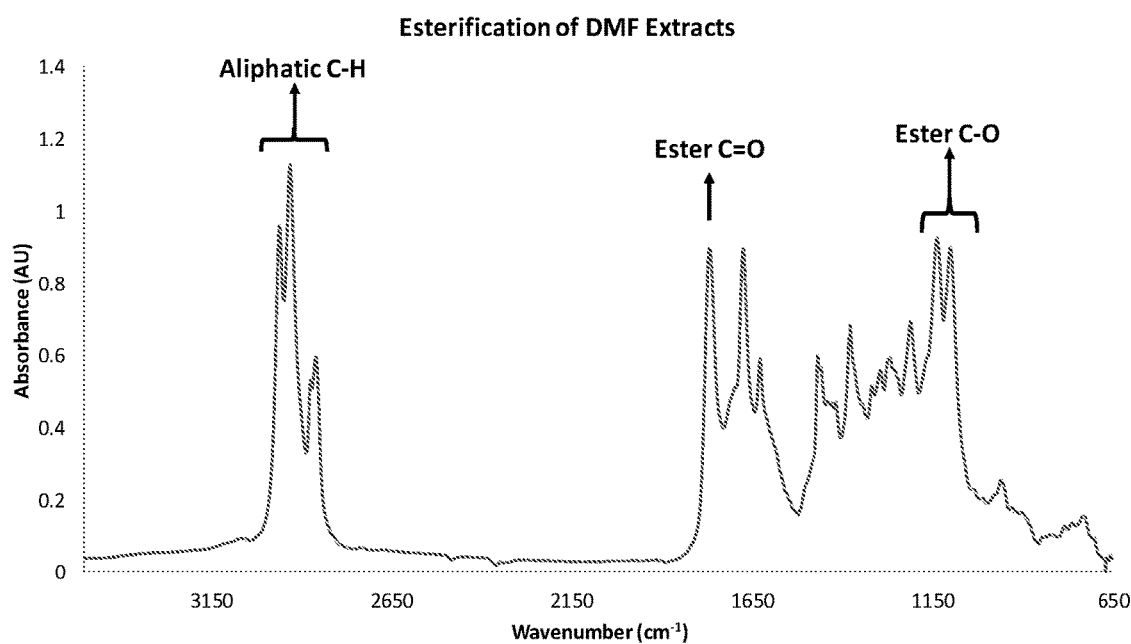
FIG. 4. FTIR spectra from CS2 and tetrachloroethylene at the same concentrations combined to provide a full FTIR spectrum of the esterified DMF extracted material.

DMF was removed from the extracts using vacuum distillation and the material was blended with asphalt. The material was highly insoluble in asphalt and did not show any ability to enhance asphalt properties, in fact it appeared to behave as an inert solid. However, esterification of the material with hexanoyl chloride in pyridine produced a significantly more soluble material. The new material was extracted with heptane to remove some residual contaminants from the synthesis and coal HS viscous components. The resulting HIS esterification product was completely soluble in toluene and did contain some less soluble coproducts. FIG. 4 shows the Fourier Transform Infrared (FTIR) spectrum of the esterification product of the DMF extracts.

The esterified DMF extracts were blended at 10 wt % in asphalt at 180° C. for 30 min and the modified asphalt was analyzed according to Superpave specifications. Table 4 shows the upper and lower continuous PG and the standard PG for the modified asphalt compared to the base asphalt. The esterified DMF extracts were able to significantly boost the upper temperature PG of the modified asphalt by 11° C. while decreasing the lower temperature PG by more than 1.5° C. while also improving the ΔTc. Thus, the esterified DMF extracts may be employed as a modifier for asphalt paving applications. The increase of the upper PG and decrease in the lower PG make this modified asphalt applicable to a wider range of climate zones, load conditions, and applications compared to the base asphalt. Whereas, the lower ΔTc indicates that this material will have a lower cracking potential when used for pavement construction, more particularly in the surface layer. By limiting the amount of hexanoyl chloride it was observed that the HIS materials began to have a detrimental effect on the low temperature properties.

TABLE 4

Upper and lower temperature PG and continuous grade PG data for a Wyoming asphalt and the same asphalt blended with 10 wt % of dmf extracts from and blended with 10 wt % of the ester functionalized dfm extract.

| | Continuous Grade | | | | | |
| --- | --- | --- | --- | --- | --- | --- |
| | Upper PG | Lower PG | Low Temperature | | | |
| | | | m-value | S | ΔTc | PG |
| ARC BI0003 -WY | 62.0 | −16.6 | −16.6 | −20.6 | −4.0 | 58-12 |
| BI0003 + dmf Extract | 60.5 | −17.4 | −17.4 | −21.8 | −4.4 | 58-12 |
| BI0003 + dmf Extract Ester | 73.7 | −18.2 | −18.2 | −21.5 | −3.3 | 70-18 |

Figure 5:
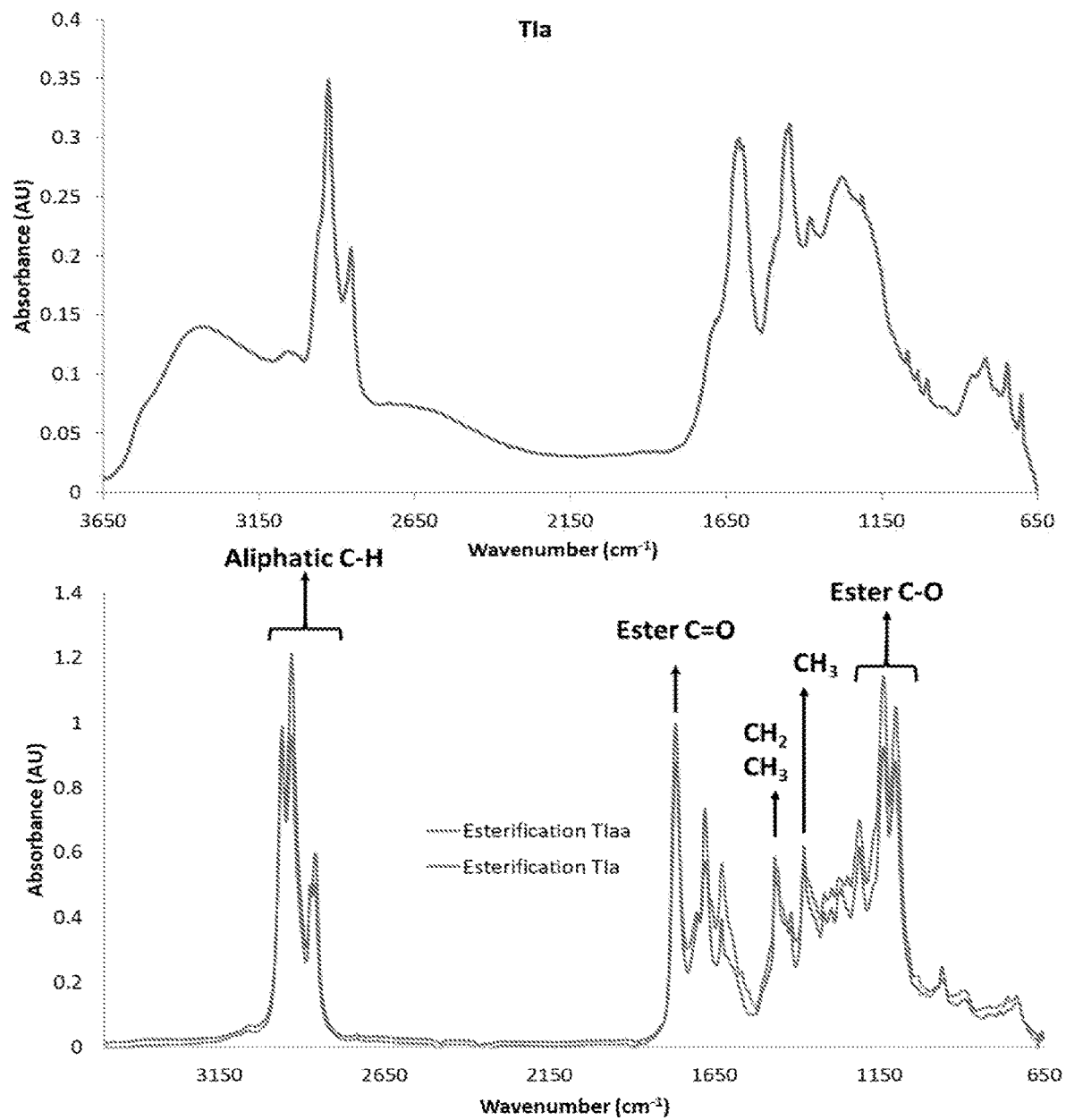
FIG. 5. Top spectra shows FTIR spectra of TIa using a solvent casting method. The bottom spectra shows both TIa and TIaa after reaction with hexanoyl chloride in pyridine to add aliphatic ester functionalities, and coproducts to TIa. To obtain the full spectra in the bottom figure, the spectra was obtained in CS2 and TCE at the same concentration.

Example 4: Tetralin Taa with Esterification Using Acyl Chloride and Organic Base Hydroxyl groups within the TI were found to be attached almost exclusively to aromatic molecules, and only trace amounts of carboxylic groups (generally <5%) were present. This was shown by FTIR experiments and 31P NMR experiments using the reactive phosphine compound 2-chloro-4,4,5,5-tetramethyl-1,3,2-dioxaphospholane. The TIaa contained about 20% more OH than TIa. Esterification of TIa and TIaa were performed in pyridine using hexanoyl chloride. The unreacted TI materials are insoluble in toluene and dichloromethane but fully soluble in pyridine. After esterification, the respective products from both TI materials were each highly soluble in both toluene and dichloromethane. FTIR spectra in FIG. 5 showed the presence of a large carbonyl band consistent with ester carbonyls, C—O ester bands, and the growth of large aliphatic C—H stretches. When compared to the FTIR spectra of the starting material, it can also be seen that there is a significant loss of the intermolecular H-bonding in the broad region 3150-3600 cm-1. The loss of the intermolecular H-bonding region is consistent with the loss of phenolic H-bonding species.

The TIaa esterification products (with coproduct) were blended with asphalt at 10 wt % loading and characterized by Superpave PG specifications. Esterification of the TIaa had a much more favorable effect on the PG than the non-derivatized TIa (which could be melted and blended into the asphalt, whereas TIaa cannot be melted and is not compatible with the asphalt). The results of the continuous and standard PG for the base asphalt, the asphalt modified with 10 wt % TIa and the asphalt modified with 10 wt % of the esterified TIaa are given in Table 5. For the esterification product of TIaa, the continuous upper temperature PG increased by more than 10° C. compared to the base asphalt and the continuous lower PG grade increased by about 3° C. Although the lower temperature increased the standard low temperature PG of the asphalt was not changed. Addition of the ester C6 aliphatic chains (and coproducts) caused the critical temperature for the m-value to not be as heavily affected compared to the dispersible non-esterified Tia material. This is the underlying reason why the esterified material has a significantly better ΔTc than the non-esterified material. This change is consistent with the observation that coal tar pitch and various upgraded bottoms (visbreaking, hydroconversion, etc.) cause asphalt materials to have more negative ΔTc values, indicating a lower propensity for relaxation due to the lack of aliphatic side chains on aromatic molecules, including the asphaltenes.

TABLE 5

Upper and lower temperature PG and continuous grade PG data for a Wyoming asphalt and the asphalt blended with 10 wt % of TIa, and 10 wt % of the TIaa ester.

| | Continuous Grade | | | | | |
|---|---|---|---|---|---|---|
| | Upper | Lower | Low Temperature | | | |
| | PG | PG | m-value | S | ΔTc | PG |
| ARC BI0003-WY | 62.0 | −16.6 | −16.6 | −20.6 | −4.0 | 58-12 |
| 10% TIa | 70.3 | −4.7 | −4.7 | −26.4 | −21.7 | 70-0 |
| 10% TIaa Ester | 72.2 | −12.8 | −12.8 | −19.4 | −6.6 | 70-12 |

Example 5: Esterification of Coal Using Acyl Chloride and Organic Base

It was also found that the side reactions helped facilitate reactive extraction of coal (20% weight extracted) and particularly on the coal residue that was left from extraction of coal with tetralin. It was found that coal extracted with tetralin was more reactive than the un-extracted coal and a significantly higher amount (80%) of it could be converted into solvent soluble fraction. Thus, the coal extracted with tetralin is an activated coal product. In some embodiments, the activated coal product may be a coal-based feedstock such that additional functionality or fractionation may be employed on the activated coal product. In some embodiments, the activated coal product is a high value product.

The coproducts and esters formed from raw coal and tetralin extracted coal material were mostly soluble in toluene. Additional material could be dissolved, however, using stronger solvents like acetone, THF, dmf, pyridine and NMP. The toluene-soluble HIS fraction from the coal reaction and the reacted toluene-insoluble coal was blended with asphalt and the PG properties are given in Table 6. The HIS fraction improved the upper temperature PG and decreased the lower temperature PG, however it had a negative effect on the ΔTc. It was found that, surprisingly, the toluene-insoluble coal material, when blended into the asphalt product significantly changed the PG properties of the asphalt product. The esterified toluene-insoluble coal blended into the asphalt product did not appreciably change the upper PG but shifted the m-value to a much higher value. Thus, the esterified coal particles may be an activated particle product. The activated particle product modifies the structural properties of the asphalt, otherwise they would remain as inert particles and have very little, or no, effect on the PG properties of the asphalt.

TABLE 6

Upper and lower temperature PG and continuous grade PG data for a Wyoming asphalt and the asphalt blended with 10 wt % of HIS esterified coal extracts, and 10 wt % of the toluene-insoluble coal which has been functionalized with ester groups.

| | Continuous Grade | | | | | |
|---|---|---|---|---|---|---|
| | Upper | Lower | Low Temperature | | | |
| | PG | PG | m-value | S | ΔTc | PG |
| ARC BI0003-WY | 61.6 | −17.2 | −17.2 | −22.8 | −5.6 | 58-12 |
| BI0003 + Coal Ester HIS | 66.7 | −21.3 | −21.3 | <−30 | ~−9 | 64-18 |
| BI0003 + Coal Ester | 65.8 | 5.5 | 5.5 | <−19 | ~−25 | 64+ |

Example 6: Pyridine and Quinoline Side Products Reaction with Acylchlorides

It was found that when acyl chlorides and aromatic organic bases are used together there are side reactions causing some dimerization, oligomerization and polymerization of the aromatics and incorporation of the acyl groups. Isolation of these materials showed that the majority of the products produced were HS, but there were still some HIS materials produced. In some embodiments, this material may be used to change asphalt PG properties. Other side reactions were also observed when using organic bases such as trimethylamine. However, these materials are highly soluble in heptane.

Example 7: Etherification Using Non-Amine Based Solvents

It was found that esterification reactions on coal extracts—to produce toluene-soluble derivatives—can be facilitated without using organic amine bases in order to prevent the generation of coproducts. This was achieved using inorganic bases like K3PO4 and CsCO3. In some embodiments, reactions may be facilitated using activators, like dimethylaminopyridine, with an organic base and using the anhydrides with activators (1-methylimidazole) or catalysts instead of the acyl chlorides using common organic solvents under very mild (generally ambient) conditions.

Figure 6:
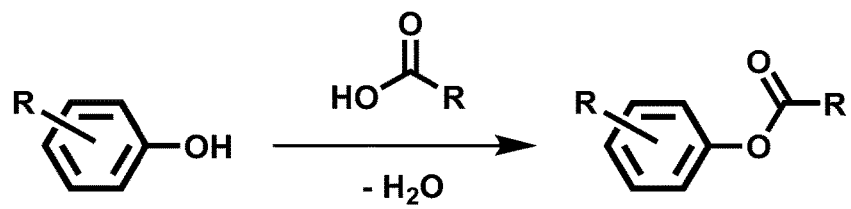
FIG. 6 shows a reaction scheme to produce a high value product from a coal-based feedstock by esterifying coal extracts using condensation of fatty acids.

In some embodiments, cost effective methods of producing a high value product from a coal-based feedstock include reacting the coal extracts directly with fatty acids (FIG. 6). The fatty acids may comprise palm oil, coconut oil, tall oil, soybean oil, corn oil, vegetable oil, canola oil, tallow, olive oil, sunflower oil and/or hemp oil. The reactions were performed using an inert gas purge to remove water or were performed using a Dean Stark apparatus. During the reaction, it was observed that some anhydrides are formed from the fatty acids. These anhydrides were removed by vacuum distillation.

Direct esterification of coal and tetralin extracted coal by this method was successful in adding significant ester groups to the coal but it was unable to produce high levels of toluene-soluble materials (<25%).

The resulting product of esterifying coal extracts was separated into HS and HIS, and the HS portion was blended with oxidized asphalt and the HIS portion was blended with virgin asphalt binder. In general, ester products produced from linear saturated fatty acids did not have very beneficial effects on the low temperature PG properties. The low temperature PG properties can be improved further by changing the diversity of the alkyl groups, by using unsaturated fatty acids, branched fatty acids or cyclic fatty acids, or mixtures of these, or mixtures with saturated fatty acids.

Figure 7:
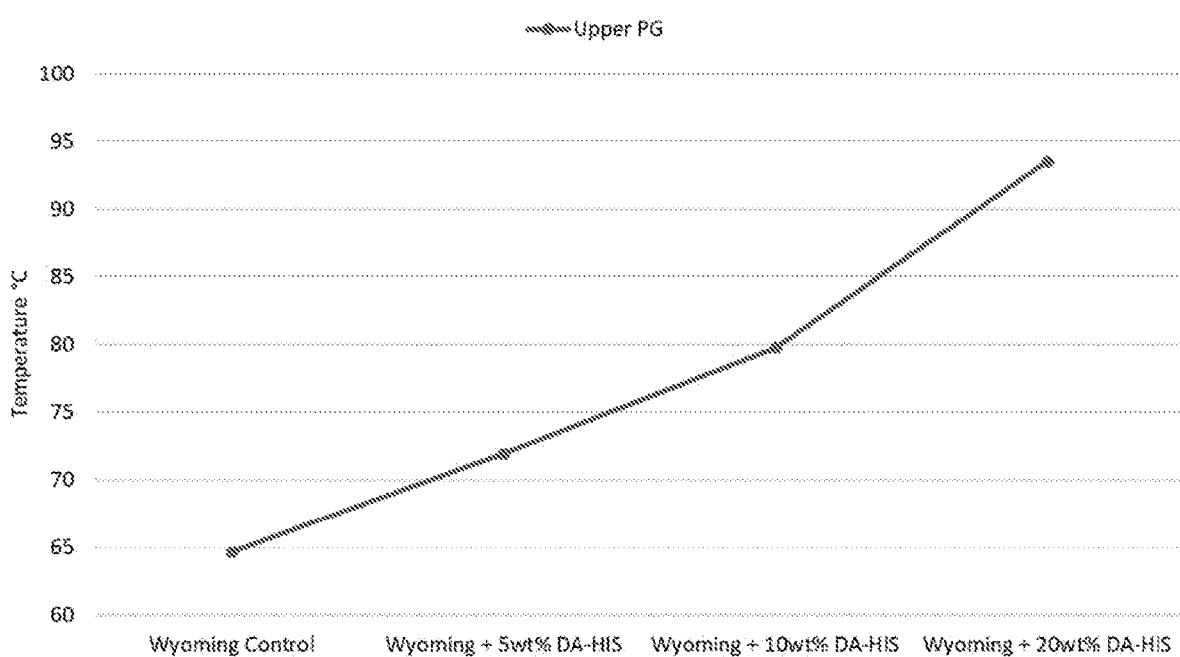
FIG. 7 shows observed Upper PG values for virgin asphalt blended with DA-HIS at 5, 10 and 20 wt %.
Figure 8:
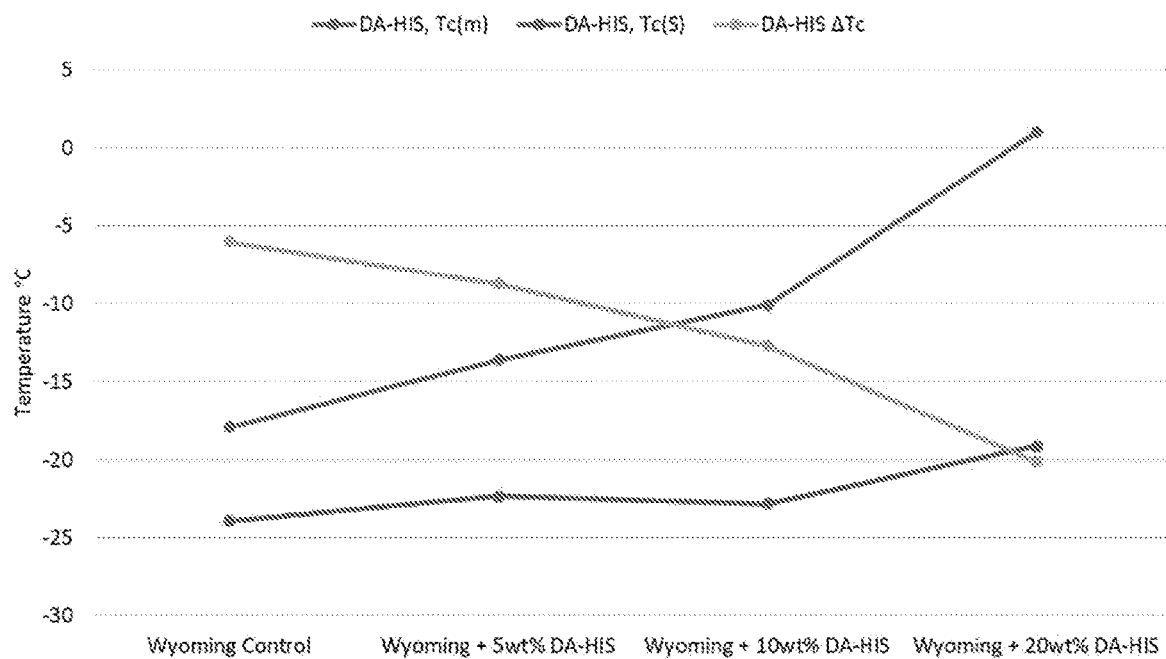
FIG. 8 shows observed Lower PG values for virgin asphalt blended with DA-HIS at 5, 10 and 20 wt %.
Figure 9:
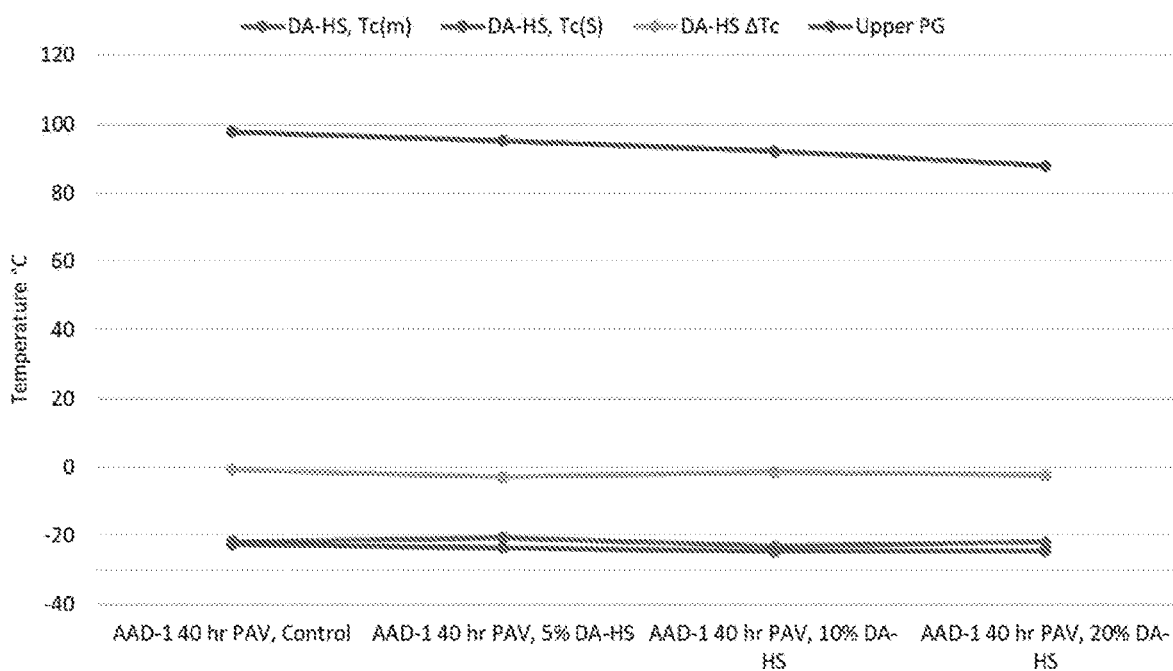
FIG. 9 shows observed Upper and Lower PG values for RTFO+40 hr PAV asphalt blended with DA-HS at 5, 10 and 20 wt %.

Decanoic acid (DA) was used as a model fatty acid, and it is a major component of coconut oil. Other useful fatty acids include linear saturated alkyl fatty acids saturates acids from C6 (hexanoic acid) to C44 (tetratetracontanoic). These cover short-chain fatty acids, medium-chain fatty acids, long-chain fatty acids and very long chain fatty acids. Many times these acids are named by other conventions such as caproic acid (C6), caprylic acid (C8), capric acid (C10), lauric acid (C12) on through C44. Other acids can be C1-C5 alkane carboxylic acid that are saturated, unsaturated, cyclic, branched or combinations of these. Other important fatty acids are those are unsaturated, whether they are mono-unsaturated (cis- or trans-) or poly-unsaturated (combinations of cis- or trans-). Some unsaturated fatty acids are myristoleic acid, palmitoleic acid, sapientic acid, oleic acid, elaidic acid, vaccenic acid, Linoleic acid, linoelaidic acid, a-linolenic acid, arachidonic acid, eicosapentaenoic acid, erucic acid, docosahexaenoic acid, to name a few. These acids can also be partially saturated by hydrogenation. Other natural sources of fatty acids are those from lard, tallow, coconut, palm oil, palm kernel oil, cotton seed oil, wheat germ oil, soybean oil, olive oil, corn oil, sunflower oil, safflower oil, hemp oil, canola oil, rapeseed oil, tall oil. Other sources for fatty acids and cyclic fatty acids can be rosin and resin material such as rosin from pine or other plant source. Other sources can be oxidized, epoxidized, partially oxidized or partially expoidized fatty acids mentioned. Other sources of fatty acids can by triclydeides and which can be reacted directly with the coal or coal extracts by transesterification. DA was reacted with TI material using a Dean Stark apparatus and the products were separated into HIS and HS. The DA-HIS was blended with virgin binder at 5, 10 and 20 wt %. FIG. 7 shows the effect on the upper PG for the DA-HIS and FIG. 9 shows the effect on the lower PG after standard conditioning, and Table 7 shows the results for the upper and lower PG properties for the HIS blends. The DA-HIS had a very significant impact on raising the upper PG (almost 30° C.), however it also raised the lower PG and decreased the ΔTc significantly. As discussed, by using different fatty acids of different lengths, that are branched, unsaturated or cyclic, with or without linear saturated fatty acids, low temperature PG properties can be tuned. Although the HIS material may not be suitable for the top layer of pavement or for cold climates, it has applications for lower levels within pavement such as formulations of hard- or multigrade-asphalt. In some embodiments, the material can also be blended with other petroleum pitches, deasphaltened residue, ROSE bottoms, hydrocracked bottoms, airblown asphalt, air rectified asphalt, straight run asphalt, asphalt blends, bio-based asphalts, bio-pyrolysis oil residues, and fluxes to produce materials with stiffness properties useful for formulating roofing binders and additives for roofing binders.

TABLE 7

Summary of upper and lower PG parameters for virgin asphalt blended with DA-HIS at 5, 10 and 20 wt %.

| | DA-HIS Blended with Wyoming BI0003 | | | |
| --- | --- | --- | --- | --- |
| | | | Lower PG | |
| DA-HIS % | Upper PG | Tc(S) | Tc(m) | ΔTc |
| 0 wt % | 64.7 | −23.9 | −17.9 | −6.0 |
| 5 wt % | 72.0 | −22.3 | −13.6 | −8.7 |
| 10 wt % | 79.8 | −22.8 | −10.1 | −12.7 |
| 20 wt % | 93.6 | −19.1 | 1.0 | −20.1 |

For the DA-HS portion, it was blended with laboratory aged AAD-1 asphalt at RTFO and 40 hr PAV conditioning at 5, 10 and 20 wt %. FIG. 9 shows the effect on the upper and lower PG properties and Table 8 lists the results. The DA-HS portion acts as an acceptable rejuvenator by decreasing the upper PG with also lowering the lower PG and causing negligible effects on the ΔTc.

TABLE 8

Summary of upper and lower PG parameters for AAD-1 RTFO + 40 hr PAV asphalt blended with DA-HS at 5, 10 and 20 wt %.

| | DA-HS Blended with AAD-1, 40 hr PAV | | | |
| --- | --- | --- | --- | --- |
| | | | Lower PG | |
| DA-HS % | Upper PG | Tc(S) | Tc(m) | ΔTc |
| 0 wt % | 97.8 | −22.7 | −21.9 | −0.8 |
| 5 wt % | 95.2 | −23.7 | −20.8 | −2.9 |
| 10 wt % | 92.1 | −24.7 | −23.2 | −1.5 |
| 20 wt % | 88.0 | −24.5 | −22.1 | −2.4 |

Figure 10:
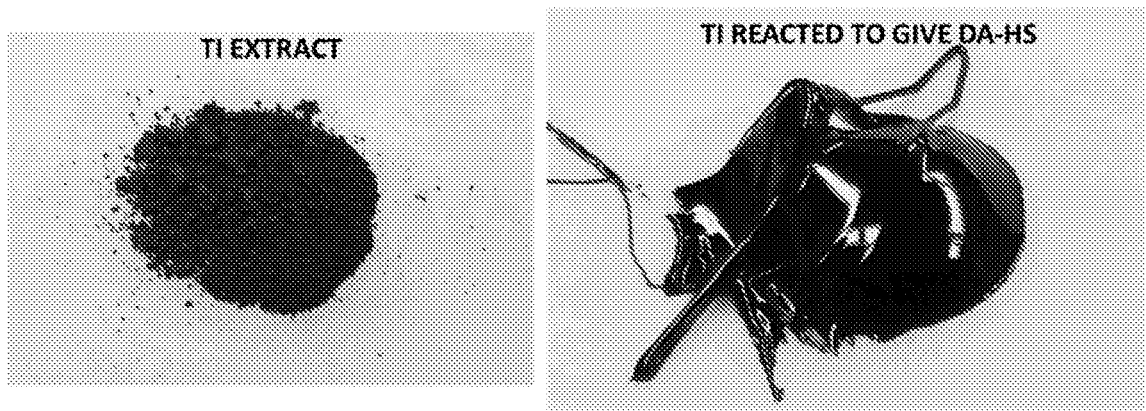
FIG. 10 is a Photograph showing the tetralin extracted TI on the left, and the HS material after reaction with decanoic acid (DA-HS) on the right.

FIG. 10 illustrates the change in the consistency of the TI fraction compared to the DA-HS product. FIG. 10 is a photograph showing the tetralin extracted TI on the left, and the HS material after reaction with decanoic acid (DA-HS) on the right. As shown, the extracted TI material is a dark brown solid at ambient temperature and the DA-HS is a black viscous oil at ambient temperature. No heating was applied to the DA-HS sample to apply it to the paper for the photograph.

Etherification

Coal extracts readily react with haloalkanes in the presence of a base to form ethers. The reaction is also useful for producing esters for coal extract fractions that are enriched in carboxylic acids.

Amine Chemistry

In addition to phosphonate esters, several effective commercial liquid amine antistrip additives for asphalt are comprised of amidoamine compounds, which are formed by the condensation reactions of fatty acids with polyamines. Unlike highly favored carboxylic acid condensation reactions that take place in the presence of amines, amine condensation reactions are generally not favored at aromatic O—H positions of phenols without the addition of catalysts or other special conditions. This is due to a significant shift in keto enol tautomerism equilibrium to the enol form, due to highly stable aromatization of phenols. The stability of the enol form results in deprotonation of the phenols by amines instead of condensation. Deprotonation of phenolics results in a product with increased ionic behavior, which may make them suitable for making ionic liquids or ionic surfactants. In one embodiment, the phenols and polyphenoilics in coal extracts are converted to carboxylic acids. The carboxylic acids may then undergo condensation reactions with amines.

Figure 11:
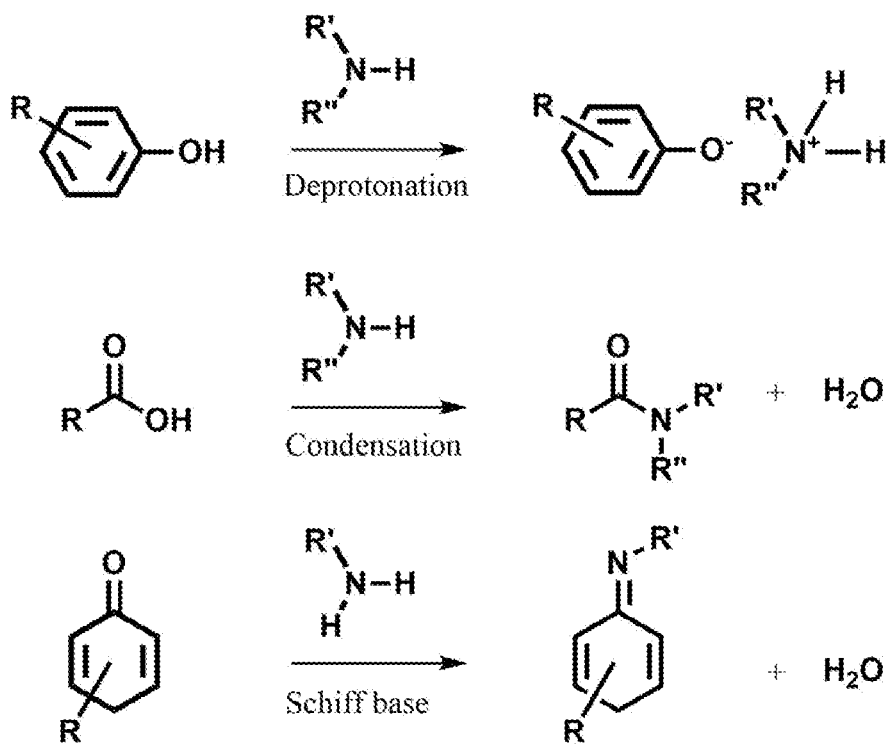
FIG. 11 shows reactions of oxygen containing functional groups in coal with primary and secondary amines to produce a high value product from a coal-based feedstock.

Ketone and/or quinone type species present are present in fractions disclosed herein, especially coal extracts produced using tetralin. These carbonyl based oxygen groups may be functionalized via Schiff base and amine condensation types of reactions. FIG. 11 shows the exemplary reactions of amine compounds that are useful for increasing the solubility of coal extracts to make a least one high value product. It must be noted that due to the complexity of coal extracts, the multiplicity of reaction pathways, and by using more forcing conditions (but below amine decomposition conditions), it is possible to access some additional amine reactions including some direct condensation of phenolic O—H groups (Tagaya, H.; Sugai, J.; Onuki, M.; Chiba, K. Low-Temperature Coal Liquiefaction using n-butylamine as a Solvent, *Energy and Fuels* 1, 397-401, 1987) Additional results are accessed by heating up the reactions of amines with coal extracts and coal above about 250° C.

FIG. 11 Shows reactions of oxygen containing functional groups in coal with primary and secondary amines. R' can be the same as R or R". R' can be different from R or R" or it can be H.

Reduced Amine Decomposition Products

By reacting decylamine, a fatty amine which is a major component in coconut fatty amines, with TI extracts under various conditions, the yield between HS and HIS may be modulated and the different product properties can be employed to produce an engineered TI-extract high value product. The TI-extract high value product may then be blended with asphalt. In some embodiments, an unfractionated product can be used to produce an asphalt PG graded material.

By reacting TIaa with decylamine at 200° C., a black viscoelastic material is produced which has properties which are similar to a traditional petroleum asphalt producing a material with a standard PG grade of PG 58-22. The ΔTc for this material was about −4° C. However, as this material contains low saturates and aromatics and is mostly resins and asphaltenes, the ΔTc may not be dispositive for this material and other cracking based tests like the Asphalt Binder Cracking Device are warranted.

The TIaa decylamine (DAM) product was separated into HS and HIS and these were blended with aged asphalt and virgin asphalt, respectively. For the HS DAM product, it had excellent rejuvenator properties to significantly lower the upper PG (~25° C.), lower the lower PG (~7° C.) and increase ΔTc (+2° C.) when blended with AAD-1 RTFO+40 hr PAV. These results are shown in Table 9.

TABLE 9

PG properties for AAD-1 RTFO + 40 hr PAV and a blend with 10% DAM-HS:

| | Continuous Grade | | | | |
|---|---|---|---|---|---|
| | Upper PG | Lower PG | Low Temperature | | |
| | | | m-value | S | ΔTc |
| AAD-1 RTFO + 40 hr PAV | 96.7 | −21.7 | −21.7 | −23.5 | −1.8 |
| AAD-1 40 hr PAV + 10% DAM-HS | 72.5 | −28.1 | −28.8 | −28.1 | +0.7 |

Since the performance of the DAM-HS additive was high in the AAD-1 RTFO+40 hr PAV, another 10% blend was prepared using another SHRP core binder AAA-1 after RTFO+40 hr PAV conditioning. The results were very similar showing a significant reduction in the upper PG, lower PG and improvement in ΔTc. These results are shown in Table 10.

TABLE 10

PG properties for AAA-1 RTFO + 40 hr PAV and a blend with 10% DAM-HS:

| | Continuous Grade | | | | |
|---|---|---|---|---|---|
| | Upper PG | Lower PG | Low Temperature | | |
| | | | m-value | S | ΔTc |
| AAA-1 RTFO + 40 hr PAV | 85.8 | −22.9 | −22.9 | −22.9 | 0 |
| AAA-1 40 hr PAV + 10% DAM-HS | 76.4 | −26.8 | −27.3 | −26.8 | +0.5 |

For the DAM-HIS product, this material also was effective at improving the PG at the upper and lower ends, but it also had some negative effect on the ΔTc. Table 11A shows the results of blending DAM-HIS with a virgin asphalt.

TABLE 11A

PG properties for virgin BI0003 and a with 10% DAM-HIS.

| | Continuous Grade | | | | |
|---|---|---|---|---|---|
| | Upper PG | Lower PG | Low Temperature | | |
| | | | m-value | S | ΔTc |
| Wyoming ARC BI0003 | 62.3 | −16.2 | −16.2 | −20.7 | −4.5 |
| BI0003 + 10% DAM-HIS | 74.9 | −18.4 | −18.4 | −25.2 | −6.8 |

In some embodiments, besides stiffening and improving relaxation, the decylamine product may have a substantial stabilizing effect on decreasing pavement, or asphalt shingle, damage due to stripping or raveling. Stripping is the loss of adhesion of the asphalt material to rock aggregate, shingle granules or shingle backing materials due to water. Raveling also includes the loss of cohesion within the asphalt material. Amines generally cause very strong adsorption to active sites on surfaces, which are significantly less sensitive to being removed by water, especially when compared to oxygen functional groups. Fatty amine derivatives in particular are common liquid antistrip agent used in the industry. In addition to antistrip properties, the amines can be protonated to produce anti-microbial properties. Bringing this type of function to the coal derivative through the appropriate reaction makes the reaction product a multipurpose additive.

Example 8: TIa with Decylamine

TI materials may be processed to a high value product via reactions such as deprotonation and Schiff base reactions of ketone or quinoline carbonyls. Amine condensation reaction pathways are more significant for whole pitch materials produced after mild chemical oxidation, air/oxygen oxidation, or from extraction processes at temperatures <250° C. due to the increased presence of carboxylic groups. Carboxylic acid species are not prevalent in most coal tar pitches since they are some of the first functional groups to undergo thermal degradation to evolve $CO_2$.

In the FTIR spectra of the TIa material in FIG. 12 there is a shoulder around 1700 cm$^{-1}$ which corresponds to a carbonyl (C═O) stretch, and since $^{31}$P NMR experiments confirmed an absence of carboxylic acids, the carbonyl must be largely in the form of ketones. These ketones are amenable to Schiff base type of reactions. To demonstrate this, TIa was heated in decylamine under reflux and the reacted product of deprotonation and Schiff base was isolated. The decylamine functionalized product was completely soluble in toluene, whereas the TIa is insoluble in toluene and dichloromethane but soluble in pyridine. Differential scanning calorimetry of the decylamine functionalized material showed that this material now possessed a glass transition with an inflection around 18° C. and a width of 85° C. making its behavior similar to polymers and asphalts.

FIG. 12. Top is an FTIR spectrum of TIa material using a solvent cast from pyridine. Bottom shows FTIR spectrum taken in tetrachloroethylene of the TIa material reacted with decylamine. By comparing the spectra, it is clear that the C=O shoulder is gone, there is a significant amount of aliphatic material and the intermolecular O—H hydrogen bonding region is decreased.

Since the decylamine functionalized TIa material was soluble in toluene, and had a glass transition, it has a higher compatibility with asphalt. The decylamine functionalized material was blended with a Wyoming asphalt at 10 wt % and the results compared to the base asphalt and TIa are shown in Table 4.

TABLE 11B

Upper and lower temperature PG and continuous grade PG data for a Wyoming asphalt and the same asphalt blended with 10 wt % of TIa and blended with 10 wt % of the decylamine product derived from TIa.

| | | | Continuous grade | | | |
|---|---|---|---|---|---|---|
| | Upper | Lower | Low Temperature | | | |
| | PG | PG | m-value | S | ΔTc | PG |
| ARC BI0003-WY | 62.0 | −20.4 | −20.4 | −24.6 | −4.2 | 58-18 |
| 10% TIa | 70.3 | −4.7 | −4.7 | −26.4 | −21.7 | 70-0 |
| 10% Deacylamine Product | 72.0 | −2.1 | −2.1 | −17.8 | −15.7 | 70-0 |

Although the decylamine product was soluble in toluene, it caused the upper PG of the blend to be almost 2° C. higher than the blend with only the TIa material. This increase is attributed to the increased molecular and ionic nature of the product due to Schiff base reaction and deprotonation of phenolic groups, respectively. This also caused the lower temperature PG to increase by more than 2° C. Despite the increase in the continuous upper and lower temperature PG, the addition of the C10 chains from the decylamine did significantly improve the ΔTc from −21.7 to −15.7° C.

Example 9: Amine Decomposition Products with Coal as the Feedstock

In some embodiments fatty amine reactions are performed directly on coal as the feedstock. In some embodiments, the reactions are heated to greater than 250° C. In some embodiments, the reactions are heated to 250 to 360° C. In some embodiments, the reactions are heated to 250 to 450° C., resulting in a significant amount of coal decomposition. Similar reactions have been described for the reaction of n-butyl amine with coal (Tagaya, H.; Sugai, J.; Onuki, M.; Chiba, K. Low-Temperature Coal Liquefaction using n-butylamine as a Solvent; Energy and Fuels 1, 397-401, 1987). The optimization of coal extraction occurs around 300-360° C. GCMS shows mostly paraffins from C8-C12 in light ends, C16-C24 in vacuum distillate, branched paraffins and only a small amount of decyl nitrile (hydrogen loss and possible hydrogen transfer to coal), heptane soluble fraction contained small amounts of +C24. The large amount of paraffins in distinct ranges suggest that there is some decomposition of the amine and coupling of alkyl groups. The coal product is very soluble with 86% of the toluene-soluble distilled residue being soluble in heptane. Up to 82% of Wyoming Power River Basin coal can be extracted as a toluene-soluble product by this reactive extraction method. This high solubility is likely due to a combination of amine condensation adding alkyl-amine groups to the coal OH groups and there is likely chain transfer of the alkyl group of the amine into the coal since the nitrogen content is too low for the products and GCMS results show coupling of amine alkyl groups as a major side product. Of the toluene-soluble fraction about 84% is HS and is a black viscous oil and 16% is HIS is a black solid. By FTIR the HS and HIS materials show significant enhancement in the aliphatic regions, a decrease in the intermolecular H-bonding; and in the case of the HIS material, amides are present. Via $^{31}$P NMR no phenolic, carboxylic or alkyl OH groups were present. (see, Wroblewski, A. E.; Lensink, C.; Markuszewski, R.; Verkade, J. G. 31P NMR Spectroscopic Analysis of Coal Pyrolysis Condensates and Extracts for Heteroatom Functionalities Possessing Labile Hydrogen. 198588; Energy Fuels, 2, 765-774. Gellerstedt, G.; Li. J.; Eide, I. Kleinert, M.; Barth, T. Chemical Structures Present in Biofuel Obtained from Lignin. 2008; Energy Fuels, 22, 4240-4244). This suggests that all of the O—H groups have been reacted. The elemental composition of the products and coal are shown in Table 12. From the elemental analysis, the enrichment in aliphatic groups and nitrogen are apparent, as well as a significant decrease in the oxygen content. The HIS material was more aromatic and contained more oxygen and nitrogen than the HS product. The HS product also had a differential scanning calorimetry (DSC) glass transition of −50 to −55° C. while the HIS product had glass transition much higher at 46 to 59° C. The lack of O—H groups and the presence of nitrogen may impart good antistripping properties to this material.

TABLE 12

CHNOS analysis for the coal used in the decylamine decomposition reaction and the HS and HIS products.

| Sample | Carbon % w/w | Hydrogen % w/w | Nitrogen % w/w | Oxygen % w/w | Sulfur % w/w | H/C * 12 |
|---|---|---|---|---|---|---|
| Coal Moisture & Ash Free | 69.69 | 4.25 | 0.97 | 24.65 | 0.44 | 0.73 |
| Decylamine Decomposition HS | 82.59 | 10.42 | 2.45 | 3.82 | 0.10 | 1.51 |
| Decylamine Decomposition HIS | 79.09 | 7.74 | 3.36 | 6.56 | 0.15 | 1.17 |

Compositionally, the decylamine decomposition (DAMD) HS and HIS fractions are similar to petroleum based asphalt components relative to the saturates, aromatics, resins, asphaltenes (SARA) separation. This was evaluated using the advanced saturates, aromatics, resins-coupled to the Asphaltene Determinator (SAR-AD) separation (See: US Department of Transpiration, Federal Highway Administration, Tech Brief, Automated High-Performance Liquid Chromatography Saturate, Aromatic, Resin and Asphaltene Separation, FHWA Publication No. FHWA-HRT-15-055; Adams, J. J.; Schabron, J. F.; Boysen, R., Quantitative Vacuum Distillation of Crude Oils to Give Residues Amenable to the Asphaltene Determinator Coupled with Saturates, Aromatics, and Resins Separation Characterization, *Energy Fuels* 29, 2774-2784, 2015; Boysen, R. B.; Schabron, J. F., The Automated Asphaltene Determinator Coupled with Saturates, Aromatics, Resins Separation for Petroleum Residua Characterization, *Energy Fuels* 27, 4654-4661, 2013).

Table 13 shows the SAR-AD profile for the DAMD-HS and DAMD-HIS materials. From this data, the HS product contains significantly more maltenes and is highly enriched in resins compared to the HIS material which is highly enriched in asphaltenes. The DAMD-HS material is highly enriched in aromatics and resins. Thus, in some embodiments, the DAMD-HS material is employed as a material for stabilizing asphaltenes in asphalt.

TABLE 13

SAR-AD data for DAMD-HS and DAMD-HIS products.

| | Maltenes | | | | | Asphaltenes | | | Total ELSD |
|---|---|---|---|---|---|---|---|---|---|
| Sample ID | Sat | Arom 1 | Arom 2 | Arom 3 | Resins | $CyC_6$ | Toluene | $CH_2Cl_2$:MeOH | Asphaltenes |
| DAMD-HS | 2.23 | 0.47 | 6.85 | 36.33 | 39.69 | 1.41 | 12.82 | 0.19 | 14.42 |
| DAMD-HIS | 0.00 | 0.00 | 0.00 | 2.26 | 10.17 | 3.21 | 76.39 | 7.98 | 87.57 |

The HS decylamine decomposition (DAMD-HS) fraction was blended with laboratory-aged asphalt and the material characterized by DSR to measure its effects on the upper and lower temperature PG properties (Table 14). For these blends they were produced under ambient air using a high shear mixer to blend the AAD-1 RTFO+40 hr PAV and the aged asphalt with the DAMD-HS to also evaluate ambient air mixing. After mixing the AAD-1 RTFO+40 hr PAV by this method, the material became stiffer than mixing under an inert atmosphere. The DAMD-HS material showed good performance while reducing the upper and lower PG while improving the ΔTc.

TABLE 14

Upper and lower PG properties for AAD-1 RTFO + 40 hr PAV blended with a high shear mixer under ambient air and AAD-1 RTFO + 40 hr PAV blended with DAMD-HS under the same conditions.

| | Continuous Grade | | | | |
|---|---|---|---|---|---|
| | Upper | Lower | Low Temperature | | |
| | PG | PG | m-value | S | ΔTc |
| AAD-1 RTFO + 40 hr PAV | 109.1 | −12.1 | −12.1 | −18.3 | −6.2 |
| AAD-1 40 hr PAV + 10% DAMD-HS | 94.7 | −23.0 | −23.0 | −26.1 | −3.1 |

Example 10: Amine Decomposition Products on Residual Coal Leftover from Tetralin Extraction The major byproduct from the tetralin extraction process is the residual coal remaining after the extraction process. This material can also be converted into additional toluene-soluble extracts by subjecting this material to the decylamine decomposition reaction. Reacting the tetralin extracted coal with decylamine under the same conditions converted 77% to toluene-soluble material. Table 15 shows the CHNOS composition of the whole toluene-soluble DAMD product. The whole toluene-soluble product produced less HS material and more and HIS than the reaction on coal. This may be partly due to many of the lighter extractable components of the coal being removed during the tetralin extraction process.

TABLE 15

CHNOS analysis of the toluene-soluble product from the tetralin-extracted coal using DAMD under the same conditions used for coal.

| Sample ID | Carbon % w/w | Hydrogen % w/w | Nitrogen % w/w | Oxygen % w/w | Sulfur % w/w | H/C * 12 |
|---|---|---|---|---|---|---|
| Tetralin Extracted Coal-DAMD, whole | 80.74 | 10.30 | 2.22 | 4.74 | 0.09 | 1.53 |

Example 11: Amide Reaction

In some embodiments, the coal-based feedstock may be converted to a high value product via reaction with amides. Functionalization of coal based material with fatty amides provides additional routes to chemical modification, as well as cost savings compared to fatty amines.

Example 12: Other Polyfunctional Chemistry

In some embodiments, sequential reactions for both acylation/esterification and Schiff base imine formation may be performed to increase the amount of derivatization of coal extracts. It has been found that the amines have a tendency to react with ester groups to form amides and liberate alcohols.

In some the embodiments, the amides may be reacted with acyl halides in the presence of a base to from β-lactams. In some embodiments, the amides may be reacted with anhydrides to undergo cycloaddition reactions, to give γ-lactams or other products. Additional reactions of imine products or acylation/esterification products gives additional pathways to more sophisticated molecules with additional functionality.

More useful simple multifunctional modification for coal extracts can be achieved by starting with reactions to produce ethers from the phenolic reacting phenolic groups. Ethers are significantly less reactive than esters making them more tolerant to undergo additional reactions. In some embodiments, coal extracts may be reacted to form ethers and the remaining unreacted carbonyl groups (and esters formed from by reaction with carboxylic groups) may be further reacted to form imines or other products. FIG. 13 shows the esterification of a phenolic molecule containing a quinone type moiety followed by amine condensation. The reaction is a sequential reaction of TI to form an ether at the phenolic position followed by a condensation Schiff base reaction at the carbonyl to form an imine.

In some embodiments, the high value product(s) made from conversion of a coal-based feedstock, include esters, ethers, amine products and phosphorylation products useful as asphalt modifiers for paving and roofing industries. The resulting added ketone, ester, phosphate ester and/or nitrogen functional groups cause strong adsorption to surfaces while being less susceptible to undergo hydrogen bond with water. In one aspect, these features of the high value product result in significantly better adhesion to rock aggregate, granules, fillers, and fiberglass backing and reduce the tendency of the materials and blends to become debonded due to stripping by moisture and water.

These esterification products can be transformed into phenolic ester high value products via migration of the ester group onto aryl carbons by the Fries rearrangement using Lewis acids, heterogeneous catalysts, light, and/or anionic methods. In some embodiments, the materials with regenerated phenolic oxygen are useful for creating new classes of additives, resins, 3-D printing resins, composite materials, and polymers. In some embodiments, the regenerated phenolic oxygen can then be reacted further to add additional esters to produce more highly soluble additives.

Example 13: Dimers, Oligomers and/or Polymers

Figure 14:
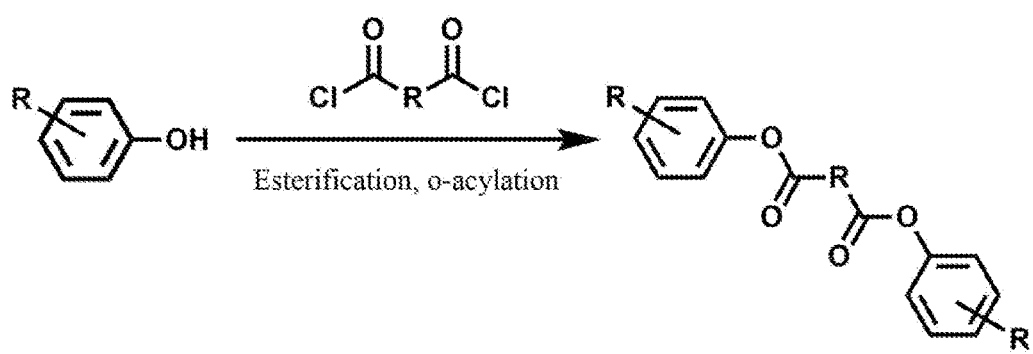
FIG. 14 shows a reaction useful in producing a high value product from a coal-based feedstock, the reaction comprising dimerization of TI material to produce a diester.

In some embodiments, by using oxygen-acylation, esterification, ether formation, amine chemistry, and the like, difunctional linker molecules can be used to produce dimeric and higher order oligomeric or polymeric materials. In some embodiments, the high value polymeric materials produced from the coal-based feedstock may be employed in paving and/or roofing asphalt applications. The disclosed polymeric materials are also highly advantageous for adhesives, stabilizers, emulsifiers, surfactants, viscosifiers, plasticizers, and polymer flooding additives. An example dimerization of TI material to produce diesters is shown in FIG. 14.

Figure 15:
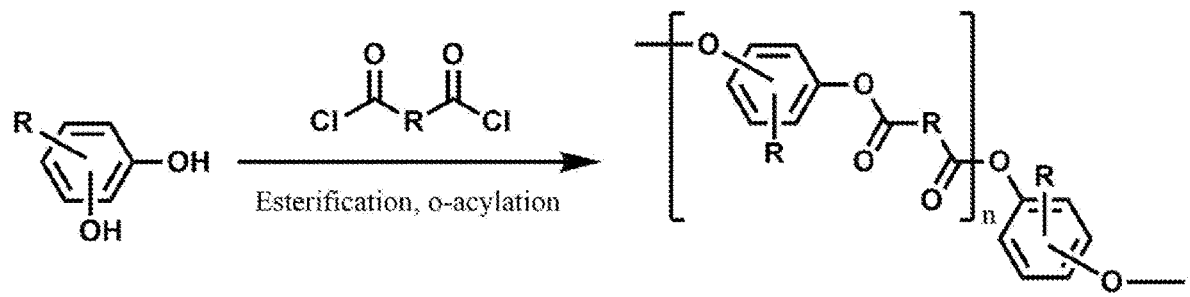
FIG. 15 shows a reaction useful in producing a high value product from a coal-based feedstock, the reaction comprising polymerization of TI material to produce diesters.

Example polymerization of TI material to produce diesters is shown in FIG. 15. These type of polyesters can also be produced using oxalyl chloride. Without wishing to be bound by theory, due to a significant amount of the molecules having more than one phenolic groups present, the dimerization shown in FIG. 14 may be kinetically hindered due to due to competition to form higher ordered polymeric type of materials as shown in FIG. 15. Higher degrees of cross-linking may be achieved using linker molecules with more than two reactive functional groups. Similarly, linker molecules with two functional groups may produce highly cross-linked polymers by using coal extracts enriched in molecules that have two or more phenolic or other reactive functional groups.

In some embodiments, several types of type of difunctional esterification, etherification, and amine reagents are used to create dimers, oliogomers and polymers materials. In particular, dihaloalkane, diesters, diacylchlorides, cyclic anhydrides, dianhydrides, diamines, and cyclolactams. By using a large excess of molecules with difunctional groups, coal extract derivitives may be created that have different unreacted pendant functional groups, such as carboncylic acids and amines. The unreacted pendant functional groups may be employed in additional reactions with other reactive molecules or other coal extracted fractions.

In some embodiments, other kinds of derivatization reactions are employed that take advantage of reaction of phenols and polyphenols at ortho-, meta-, and para-aromatic C—H position with formaldehyde or other aldehydes and amines. These types of reactions may be used to make phenolic resins.

Example 14: Diamine Polymerization of Coal

Figure 16:
FIG. 16 shows a reaction useful in producing a high value product from a coal-based feedstock, the reaction comprising polymerizing with the diamine hexamethylenediamine.

In some embodiments, diamine hexamethylenediameine may be reacted directly with coal to form polymers. By reacting coal with hexamethylenediamine at >200° C., preferably >250° C., polymerization of coal takes place to produce a swollen, strong, rubbery polymer. Once the rubbery polymer is extracted with solvent and dried it becomes hard. FIG. 16 shows a photograph of the polymerized coal removed from the reactor after solvent extraction and drying.

FIG. 16. Coal polymerized with the diamine hexamethylenediamine. Sample has been extracted with solvent and dried. The empty circle in the middle is from the stirrer and the hole to the right of the circle is where the thermocouple resided during the reaction.

Example 15: Additional Embodiments

In one embodiment, the aliphatic groups become significantly solubilizing on the derivatized coal extracts to render them soluble in heptane. In some embodiments, this HS fraction can be used as an asphaltene dispersants for oilfield applications. In some embodiments, the asphaltene dispersants comprise derivatized coal extracts with highly aromatic and/or polar groups. In one embodiment, chains of about >C12-C18 are added. The resulting derivatized materials can be used as wax inhibitors or paraffin dispersants. Long aliphatic chains greater than C12-C18 have sufficient van der Waals interactions to co-crystallize with crude oil paraffins, and the aromatic core of the derivatized molecule acts to disrupt further crystallization of paraffins. The products developed within may also serve other purposes such as to compatibilize plastics in asphalt.

Example 16: Esterification of with Hexanoyl Chloride in Pyridine

Coal extracts from TIaa or dmf (1 g) were dissolved in 20 mL of pyridine with stirring and purging with argon for 5 minutes. After purging, hexanoyl chloride was added to the mixture via syringe and the mixture was refluxed for 24 hrs. The reaction mixture was cooled to ambient temperature and then poured into distilled water. To the mixture was added 20 mL of dichloromethane and the aqueous layer was extracted three times with distilled water. Volatiles were removed from the organic layer by vacuum distillation to give a black viscous oil. The oil was extracted with heptane and the black HIS solids were filtered on a glass sintered funnel. Heptane was removed from the filtrate to give a brown viscous oil. The HS and HIS products were dried in a vacuum oven at 100° C. overnight under full dynamic vacuum. The yields from the TIaa and dmf extracts were very similar, producing 1.5 of HIS and 1.8 g of HS. Note: the products from this reaction also contain some coproducts from the reaction of hexanoyl chloride directly with pyridine.

Example 17: Esterification of Branched Acylchlorides in Pyridine

The reactions were performed using the procedure for the hexanoyl chloride reaction. Using 2.44 mL of 2-octanoyl chloride produced 2.25 g of HS product and 0.48 g of HIS product. By adding branched ester groups the yield of the HIS product is reduced.

Example 18: Reaction of Pyridine with Hexanoyl Chloride 50 mL pyridine was added to 100 mL 1-neck round bottom flask and connected to a condenser. Flowing argon was used to purge the reaction flask for 10 min and 10 mL hexanoyl chloride was added. The reaction mixture was heated at 100° C. with stirring for 24 h. Upon completion, the reaction mixture was cooled ambient temperature and distilled water (100 mL) was added to the reaction mixture to quench the reaction. The reaction mixture was extracted with dichloromethane (3×20 mL) and the organic layer was washed with water (6×20 mL). The crude product was subjected to high vacuum distillation using an oil bath set to 100° C. to remove pyridine and other side products. A black semisolid residue was obtained, which was extracted with n-heptane (50 mL) and filtered. Heptane was removed from filtrate by rotary evaporation. This HS and HIS filtered solids were dried under full dynamic vacuum at 100° C. in vacuum oven for 3 h. Heptane-insolubles were completely soluble in toluene. Yields: HS 5.67 g and HIS 1.60 g. This material was produced via oligomerization and polymerization of pyridine with incorporated acyl groups.

Example 19: Reaction of Quinoline with Hexanoyl Chloride

The reaction was performed as with the pyridine reaction except that quinoline was used and that the mixture was heated at 160° C. with stirring for 24 h. The crude product was subjected to high vacuum distillation using an oil bath set to 160° C. to remove quinoline and other side products. Yields: HS 3.39 g and HIS 14.82 g. This material was produced via oligomerization and polymerization of quinoline with incorporated acyl groups.

Esterification by Condensation with Fatty Acids

Example 20: General Procedure of Reaction with Decanoic Acid with Dean Stark Coal extracts and decanoic acid (50 mL) were added to 100 mL 1-neck round bottom flask. The flask was equipped with magnetic stir bar and connected to a Dean Stark distillation receiver and condenser. Flowing argon was used to purge the assembled Dean Stark apparatus and reaction flask for 10 min. Excess argon was used to fill a balloon to keep a positive pressure of argon over the reaction. The reaction mixture was vigorously refluxed with stirring for 6 h. Upon completion, the reaction mixture was cooled to ambient temperature. Crude product was subjected to high vacuum distillation to remove decanoic acid and decanoic anhydride. Black semisolid to solid residue was extracted with n-heptane (50 mL) in a sonic bath releasing a fine black powder which was collected using 0.7μ glass microfiber filter. Heptane was removed from filtrate by rotary evaporation and a highly viscous black liquid was obtained. This HS filtrate and HIS filtered solids were dried under full dynamic vacuum at 100° C. in vacuum oven for 3 h.

Example 21: Decanoic Acid Reaction with TIaa 1.5 g of TIaa yielded 2.53 g of HS and 0.45 g of HIS solids. The dried HIS solids were completely soluble in toluene.

Example 22: Decanoic Acid Reaction with TIa 0.5 g of CE-34 TIa yielded 0.87 g of HS and 0.15 g of HIS solids. The dried HIS solids were completely soluble in toluene.

Example 23: Decanoic Acid Reaction with TIaa+TIa 359.4 mg TIaa+140.4 mg Tia (this proportion was chosen according to yields of this fractions in coal extraction process) yielded 0.92 g of HS and 0.19 g of HIS solids. The dried HIS solids were completely soluble in toluene.

Example 24: Decanoic Acid Reaction with TI

TI is equivalent to unseparated TIaa and TI. 4 g of TI yielded 4.18 g of HS and 3.17 g of HIS solids.

Example 25A: Decanoic Acid Reaction with TI without Dean Stark

TI (0.5 g) were added to 50 mL 1-neck round bottom flask followed by the addition of 25 mL decanoic acid. The flask with reagents was equipped with magnetic stir and was purged by bubbling argon through the reaction mixture. The reaction mixture was heated at 250° C. and stirred for 6 h. The work up of the reaction product was the same as for the Dean Stark reactions. Yields: HS 0.053 g, HIS/toluene-soluble solids 0.049 g and HIS/toluene-insoluble solids 0.810 g.

Example 25B: Oleic Acid Reaction without Dean Stark

TI (1.0 g) was added to 50 mL 1-neck round bottom flask followed by the addition of 25 mL oleic acid. The flask with reagents was equipped with magnetic stir and was purged by bubbling argon through the reaction mixture. The reaction mixture was heated at 270° C. and stirred for 6 h. The work up of the reaction product was the same as for the Dean Stark reactions. Yields: HS 3.9 g and no HIS was observed.

Example 26: 2-Hexyldecanoic Acid Reaction with TI with Dean Stark

TI (0.25 g) were added to 50 mL 1-neck round bottom flask followed by the addition of 25 mL 2-hexydecanoic acid. The flask with reagents was equipped with magnetic stir and was purged by bubbling argon through the reaction mixture. The reaction mixture was heated at reflux and stirred for 6 h. The work up of the reaction product was the same as for the Dean Stark reactions. Yields: HS 0.436 g, HIS 0.069 g.

Esterification by Other Methods

Example 27: Alternative Esterification Method I

Figure 17:
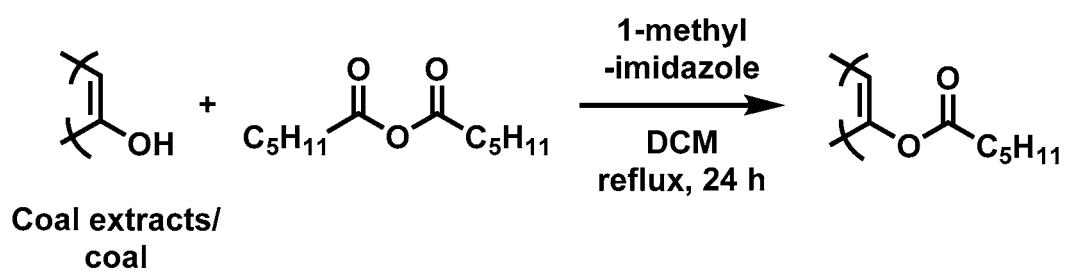
FIG. 17 shows a first alternative esterification reaction to produce a high value product from a coal-based feedstock.

In one embodiment, the method includes the esterification reaction shown in FIG. 17. In one example, 0.2 g of TIaa was added to 25 mL round bottom flask followed by the addition of 10 mL dichloromethane. The flask was purged with argon for 5 min followed by addition of 0.104 mL 1-Methylimidazole and 0.68 mL hexanoic anhydride. The reaction mixture was refluxed for 24 h. After this time the reaction mixture was cooled to ambient temperature. Distilled water (20 mL) was added to the reaction mixture to quench the reaction. The reaction mixture was acidified with 2N HCl (10 mL) and washed with sat. NaHCO$_3$ solution. The reaction mixture was extracted with dichloromethane (2×10 mL) and the organic layer was washed with water (3×20 mL). The organic layer was filtered to recover insoluble partially reacted/unreacted starting material. Solvents from the organic layers were removed under reduced pressure with rotatory evaporation. The crude product was further dried in vacuum oven at 100° C. for 3 h. A black semisolid residue was obtained, which was extracted with n-heptane (15 mL) and filtered. Heptane was removed from filtrate by rotary. This heptane-soluble and HIS filtered solids were dried under full dynamic vacuum at 100° C. in vacuum oven for 3 h. Yield for HS was 0.029 g and HIS was 0.209 g.

Example 28: Alternative Esterification Method II

Figure 18:
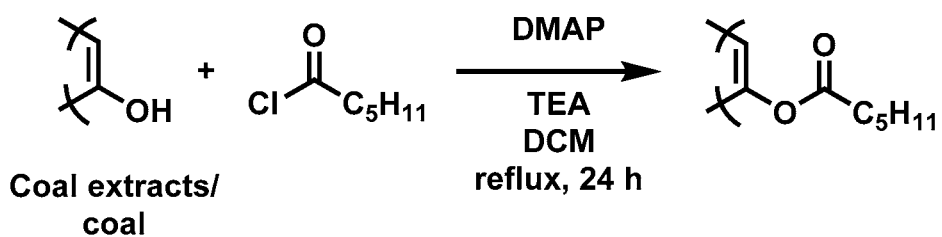
FIG. 18 shows a second alternative esterification reaction to produce a high value product from a coal-based feedstock.

In one embodiment, the method includes the esterification reaction shown in FIG. 18. In one example, 0.2 g of starting material was added to 25 mL round bottom flask followed by the addition of 10 mL dichloromethane. The flask was purged with argon for 5 min followed by addition of 0.024 g dimethylaminopyridine (DMAP), 0.168 mL trimethylamine (TEA) and 0.4 mL hexanoyl chloride. The reaction mixture was refluxed for 24 h. After this time the reaction mixture was cooled ambient temperature. Distilled water (20 mL) was added to the reaction mixture to quench the reaction. The reaction mixture was acidified with 2N HCl (10 mL) and washed with sat. NaHCO$_3$ solution. The reaction mixture was extracted with dichloromethane (2×10 mL) and the organic layer was washed with water (3×20 mL). The crude product was further dried in vacuum oven at 100° C. for 3 h. A black semisolid residue was obtained, which was extracted with n-heptane (15 mL) and filtered. Heptane was removed from filtrate by rotary. This heptane-soluble and HIS filtered solids were dried under full dynamic vacuum at 100° C. in vacuum oven for 3 h. Yield for HS was 0.031 g and HIS was 0.168 g.

Example 29: Esterification of Coal

In some embodiments, the coal based feedstock may comprise crushed subbituminous coal. In this example, crushed subbituminous coal was dried and added to 500 mL 1-nech round bottom flask followed by the addition of 200 mL quinoline. 1-neck round bottom flask was equipped with magnetic stir bar and connected to a condenser. The flask with reagents was purged with argon for 15 min with argon. 100 mL hexanoyl chloride was added to the stirred slurry at ambient temperature using a syringe. The reaction mixture was stirred at 160° C. for 24 h under an argon atmosphere. After this time the reaction mixture was cooled ambient temperature. Distilled water (250 mL) was added to the reaction mixture to quench the reaction. The reaction mixture was extracted with dichloromethane (2×150 mL) and the organic layer was washed with water (3×200 mL). The organic layer was filtered to recover insoluble coal material. 20.49 g of unreacted/partially reacted coal material was recovered and dried at 220° C. under full dynamic vacuum for 24 h. Dichloromethane was removed by rotary evaporation and residual quinoline and remaining solvents were removed by vacuum distillation using a 200° C. oil bath and 0.06 torr vacuum to provide a black semisolid residue. The Black semisolid residue was extracted with n-heptane (125 mL) in a sonic bath releasing a fine black powder which was filtered and rinsed with n-heptane (125 mL) to provide a brown to black powder. Heptane was removed from the filtrate by rotary evaporation and a highly viscous black oil was obtained as the heptane-soluble product. Heptane-soluble and HIS filtered solids were dried under full dynamic vacuum at 100° C. in vacuum oven for 3 h. The dried HIS solids were completely soluble in toluene. Yields: HS 22.12 g, HIS solids 73.86 g.

Example 30: Esterification of Tetralin-Extracted Residue

In some embodiments, the high value product may comprise tetralin-extracted residue. In this example, 5 g of tetralin extracted coal residue was added to 200 mL 1-nech round bottom flask followed by the addition of 50 mL quinoline. 1-neck round bottom flask was equipped with magnetic stir bar and connected to a condenser. The flask with reagents was purged with argon for 15 min. 20 mL hexanoyl chloride was added to the stirred slurry at ambient temperature using a syringe. The reaction mixture was stirred at 160° C. for 24 h under argon. After this time the reaction mixture was cooled ambient temperature. Distilled water (100 mL) was added to the reaction mixture to quench the reaction. The reaction mixture was extracted with dichloromethane (2×50 mL) and the organic layer was washed with water (3×75 mL). The organic layer was filtered to recover insoluble coal material. 0.70 g of unreacted/partially reacted extracted residue which was dried at 220° C. under full dynamic vacuum for 24 h. Dichloromethane was removed by rotary evaporation and residual quinoline and remaining solvents were removed by vacuum distillation using a 200° C. oil bath and 0.06 torr vacuum to provide a black semisolid residue. The black semisolid residue was extracted with n-heptane (50 mL) in a sonic bath releasing a fine black powder which was filtered and rinsed with n-heptane (50 mL). Heptane was removed from the filtrate by rotary evaporation providing a highly viscous black viscous oil. This heptane-soluble and HIS filtered solids were dried under full dynamic vacuum at 100° C. in vacuum oven for 3 h. The dried HIS solids were only partially soluble in toluene. Yields: HS 17.77 g, HIS solids 26.39 g (3.15 g was toluene-insoluble).

Example 31: Etherification

Figure 19:
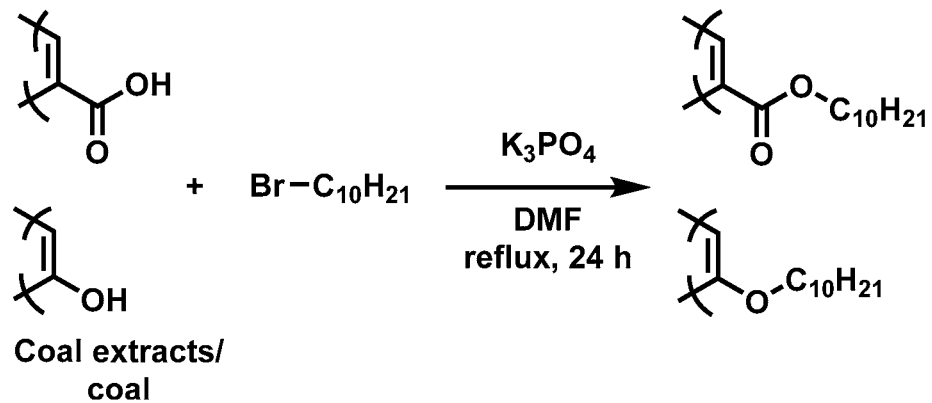
FIG. 19 shows an exemplary etherification reaction to produce a high value product from a coal-based feedstock.

In some embodiments, the high value product may be produced via etherification. In this example, the TIaa fraction was reacted as shown in FIG. 19. In the example, 0.2 g of TIaa was added to 25 mL round bottom flask followed by the addition of 10 mL N,N-dimethylformamide. The flask was purged with argon for 5 min followed by addition of 0.608 g $K_3PO_4$ and 1.02 mL 1-bromodecane. The reaction mixture was refluxed for 24 h. After this time the reaction mixture was cooled ambient temperature. Distilled water (20 mL) was added to the reaction mixture to quench the reaction. The reaction mixture was extracted with dichloromethane (2×10 mL) and the organic layer was washed with water (6×20 mL). Solvents from the organic layers were removed under reduced pressure with rotatory evaporation. Remaining crude product was further dried in vacuum oven at 100° C. for 3 h. Crude product was washed with alcohol to remove impurities. A black semisolid residue was obtained, which was extracted with n-heptane (15 mL) and filtered. Heptane was removed from filtrate by rotary evaporation. This heptane-soluble and HIS filtered solids were dried under full dynamic vacuum at 100° C. in vacuum oven for 3 h. All of the products were completely soluble in toluene. The reaction yielded 0.058 g of HS product and 0.153 g and HIS product.

Decylamine Reaction on TI

Example 32: General Procedure of Reaction with Decylamine

TI (1.0 g) were added to 50 mL 1-neck round bottom flask followed by the addition of 25 mL decylamine. The flask with reagents was equipped with stirring and the reaction maintained under a positive pressure of argon. The reaction flask was stirred and heated at 160° C. or 200° C. using an oil bath for 24 h. The reaction mixture was cooled to ambient temperature and the mixture was subjected to high vacuum distillation using an oil bath set to 200° C. A crude product was obtained as a black viscous material. The crude product was extracted with n-heptane (50 mL) using a sonic bath releasing a fine black powder which was collected using 0.7 μm glass microfiber filter. Heptane was removed from the filtrate by rotary evaporation and a highly viscous dark black liquid was obtained. This heptane-soluble and HIS filtered solids were dried under full dynamic vacuum at 100° C. in vacuum oven for 3 h.

Example 33

Reaction carried out at 160° C.: 1.0 g of TIaa deposit yielded 0.099 g of HS and 1.462 g of HIS.

Example 34

Reaction carried out at 200° C.: 1.0 g of TIaa deposit yielded 0.182 g of HS and 1.496 g of HIS.

Example 35: General Procedure of Reaction with Decylamine Using Dean Stark Apparatus 0.5 g of TIaa were added to 100 mL 1-neck round bottom flask followed by the addition of 50 mL decylamine. The flask was equipped with magnetic stir bar and connected to a Dean Stark distillation apparatus. The flask with reagents and Dean Stark apparatus was purged with argon for 10 min. An argon gas filled balloon was attached to keep the apparatus under a positive argon atmosphere during the reaction. The reaction mixture was vigorously refluxed with stirring for 6 h and then cooled to ambient temperature. Crude product was vacuum distilled using an oil bath set at 250° C. to remove side products. Black semisolid to solid residue was extracted with n-heptane (50 mL) in a sonic bath releasing a fine black powder was collected using 0.7 μm glass microfiber filter. Heptane was removed from filtrate by rotary evaporation and a highly viscous dark black liquid was obtained. Heptane-soluble viscous oil and HIS filtered solids were dried under full dynamic vacuum at 100° C. in vacuum oven for 3 h. Yield was 0.87 g of HS and 0.49 g of HIS.

Example 36: Decylamine Reaction on Coal 10 g of crushed and dried subbituminous coal and 30 mL decylamine were added to 100 mL autoclave reactor vessel.

The autoclave reactor was attached securely to autoclave assembly. The reactor with reagents was purged with argon for 15 min. The reaction mixture was stirred at 360° C. for 4 h. After this time the reactor was cooled ambient temperature. The pressurized gas from autoclave was released. 150 mL toluene was added to the reaction mixture. The reaction mixture was filtered through 0.7μ glass microfiber filter to remove unreacted/partially reacted coal. The dried weight of the toluene-insoluble unreacted/partially reacted coal was 1.96 g (80.4% conversion). Toluene from the filtrate was removed under reduced pressure using a rotatory evaporator. A black semisolid residue was obtained, which was extracted with n-heptane. Heptane was removed from filtrate by rotary evaporation and a highly viscous dark brown to black liquid was obtained. This heptane-soluble and HIS filtered solids were dried under full dynamic vacuum at 100° C. in vacuum oven for 3 h. The dried HIS solids were completely soluble in toluene. Yields: HS 14.78 g (84 wt %), HIS solids 2.85 g (16 wt %).

Example 37: Decylamine Reaction on Tetralin Extracted Coal 10 g of tetralin extracted coal residue and 30 mL decylamine were added to 100 mL autoclave reactor vessel. The autoclave reactor was attached securely to autoclave assembly. The reactor with reagents was purged with argon for 15 min. The reaction mixture was stirred at 360° C. for 4 h. After this time the reactor was cooled ambient temperature. The pressurized gas from autoclave was released. 150 mL toluene was added to the reaction mixture. The reaction mixture was filtered through 0.7μ glass microfiber filter to remove unreacted/partially reacted tetralin extracted coal residue. This material was dried to give 2.26 g (77.4% conversion) of the toluene-insoluble material. Toluene from the filtrate was removed under reduced pressure using a rotatory evaporator. A black semisolid residue was obtained, which was extracted with n-heptane. Heptane was removed from filtrate by rotary evaporation and a highly viscous dark brown to black liquid was obtained.

Example 38: Hexamethylenediamine Polymerization of Coal 10 g of crushed and dried subbituminous coal and 30 mL hexamethylenediamine were added to 100 mL autoclave reactor vessel. The autoclave reactor was attached securely to autoclave assembly. The reactor with reagents was purged with argon for 15 min. The reaction mixture was stirred at 360° C. for 4 h. After this time the reactor was cooled ambient temperature. The pressurized gas from autoclave was released. 150 mL toluene was added to the reaction mixture to remove some liquids and soluble components. At this point a ring of coal had polymerized at the bottom of the reactor and it was rubbery so that the stirrer could be forced through the middle of the polymerized ring. After removing the ring from the reactor it was extracted with toluene and dried in a vacuum oven to produce an un-swollen ring that was rigid.

Example 39: Hexamethylenediamine Reaction on TIaa

TIaa (0.100 g) was added to a flask with 50 g of hexamethylene diamine. The mixture was purged with argon and refluxed with stirring for 24 hours. Upon cooling the mixture was vacuum distilled to give 0.160 g of a black semisolid which was completely soluble in toluene.

Example 40: Amide Reaction with TI

TI (0.500 g) was added to a flask with 21.75 g of octadecanamide and purged with argon. The mixture was heated to 170° C. with a flow of argon over the reaction for 20 hours. Upon cooling to ambient temperature the reaction mixture was subjected to vacuum distillation to remove excess amide.

Example 41; Phosphorylation Reaction with TIaa

Diethyl chlorophosphate (($C_2H_5O)_2PCl$, 2 mL) was added to a flask containing TIa (0.100 g). The mixture was purged with argon and refluxed. Upon refluxing a black precipitate was form. The reaction was cooled and ethanol was added to the reaction mixture and the black solid was collected by filtration and dried in a vacuum oven. The insoluble product yield was 0.119 g and it was completely toluene-insoluble.

Statements Regarding Incorporation by Reference and Variations

All references, including publications, patent applications, and patents, cited herein are hereby incorporated by reference to the same extent as if each reference were individually and specifically indicated to be incorporated by reference and were set forth in its entirety herein.

PCT application no. PCT/US2018/050690, filed Sep. 12, 2018 and published as International Publication Application No. WO 2019/055529 on Mar. 21, 2019, is directed to systems, methods and process conditions for making high value products from feedstocks derived from coal, which is hereby incorporated by reference in its entirety to the extent nor inconsistent with the description herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, are disclosed separately. When a Markush group or other grouping is used herein, all individual members of the group and all combinations and subcombinations possible of the group are intended to be individually included in the disclosure. When a compound is described herein such that a particular isomer of the compound is not specified, for example, in a formula or in a chemical name, that description is intended to include each isomers of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a pressure range, a time range or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of processing a coal-based feedstock to a high value product, the method comprising:
   (a) contacting the coal-based feedstock with one or more solvents under non-pyrolytic conditions thereby generating a liquid phase;
   wherein the liquid phase comprises 5 to 25 wt % oxygen;
   wherein the liquid phase comprises not greater than 500 ppm small polycyclic aromatic hydrocarbons (PAH), wherein small polycyclic aromatic hydrocarbons is defined as PAH compounds having 4 or less fused aromatic rings; and
   wherein at least 50% of the oxygen in the liquid phase is in the form of phenolic, carboxylic and ketone functional groups of hydrocarbon-based compounds; and
   (b) fractionating the liquid phase to generate at least two fractions under conditions such that at least one of the fractions is the high value product.

2. The method of claim 1, wherein the liquid phase comprises not greater than 200 ppm small polycyclic aromatic hydrocarbons.

3. The method of claim 1, wherein the liquid phase comprises not greater than 50 ppm phenanthrene.

4. The method of claim 1, wherein at least 60% of the oxygen in the liquid phase is in the form of phenolic, carboxylic and ketone functional groups of hydrocarbon-based compounds.

5. The method of claim 1, wherein step (a) comprises:
   generating a liquid phase comprising at least one aromatic hydrocarbon having an oxygen-containing functional group.

6. The method of claim 5, wherein the oxygen-containing functional group comprises a hydroxyl group, a ketone group, and/or a carboxylic group.

7. The method of claim 5, wherein step (a) comprises:
   esterification of the oxygen-containing functional group of the at least one aromatic hydrocarbon.

8. The method of claim 5, wherein step (a) comprises:
   condensation of the oxygen-containing functional group of the at least one aromatic hydrocarbon.

9. The method of claim 5, wherein step (a) comprises:
   amidification of the oxygen-containing functional group of the at least one aromatic hydrocarbon.

10. The method of claim 5, wherein step (a) comprises:
    amine coupling of the oxygen-containing functional group of the at least one aromatic hydrocarbon.

11. The method of claim 5, wherein step (a) comprises:
    phosphorylation of the oxygen-containing functional group of the at least one aromatic hydrocarbon.

12. The method of claim 7, wherein the one more solvents are fatty acids.

13. The method of claim 1, wherein the contacting the coal-based feedstock with one or more solvents of step (a) is carried out at super critical fluid conditions.

14. The method of claim 1, wherein the contacting the coal-based feedstock with one or more solvents of step (a) converts at least about 15 wt % of the coal-derived feedstock to the liquid phase.

15. The method of claim 1, wherein the coal-based feedstock is generated by thermal treatment of coal or a derivative of thermally treated coal.

16. The method of claim 1, wherein the coal-based feedstock is generated by mechanical processing of coal or a derivative of mechanically processed coal.

17. The method of claim 1, comprising:
    prior to the contacting step (a), activating the coal-based feedstock by extracting the coal based feedstock with a hydrogen donor solvent and removing the liquid.

18. The method of claim 17 wherein the hydrogen donor solvent comprises tetralin.

19. The method of claim 1, wherein the contacting step (a) comprises:
    exposing the coal-based feedstock to a fatty amine;
    decomposing at least some of the fatty amine;
    converting at least 30 wt % of the coal-based feedstock from solid phase to liquid.

20. The method of claim 19, wherein the fatty amine comprises decylamine.

21. The method of claim 1, wherein the contacting the coal-based feedstock with one or more solvents of step (a) is carried out at a temperature selected from the range of about 200° C. to about 400° C.

* * * * *